United States Patent
Takahashi et al.

(10) Patent No.: US 11,718,081 B2
(45) Date of Patent: Aug. 8, 2023

(54) SHEET PROCESSING DEVICE FOR ADJUSTING PROJECTION OF BONDED PORTION, LAMINATOR, IMAGE FORMING APPARATUS, AND IMAGE FORMING SYSTEM

(71) Applicants: Wataru Takahashi, Tokyo (JP); Tomohiro Furuhashi, Kanagawa (JP); Michitaka Suzuki, Kanagawa (JP); Tomomichi Hoshino, Kanagawa (JP); Fumiharu Yoneyama, Kanagawa (JP); Kazuyoshi Matsuo, Kanagawa (JP); Makoto Hidaka, Tokyo (JP); Koki Sakano, Kanagawa (JP); Akira Kunieda, Tokyo (JP); Takahiro Watanabe, Kanagawa (JP); Takuya Morinaga, Tokyo (JP); Yohsuke Haraguchi, Kanagawa (JP)

(72) Inventors: Wataru Takahashi, Tokyo (JP); Tomohiro Furuhashi, Kanagawa (JP); Michitaka Suzuki, Kanagawa (JP); Tomomichi Hoshino, Kanagawa (JP); Fumiharu Yoneyama, Kanagawa (JP); Kazuyoshi Matsuo, Kanagawa (JP); Makoto Hidaka, Tokyo (JP); Koki Sakano, Kanagawa (JP); Akira Kunieda, Tokyo (JP); Takahiro Watanabe, Kanagawa (JP); Takuya Morinaga, Tokyo (JP); Yohsuke Haraguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/665,864

(22) Filed: Feb. 7, 2022

(65) Prior Publication Data
US 2022/0153008 A1 May 19, 2022

Related U.S. Application Data

(63) Continuation of application No. 16/842,941, filed on Apr. 8, 2020, now Pat. No. 11,273,629.

(30) Foreign Application Priority Data

Apr. 25, 2019 (JP) ................. 2019-083905

(51) Int. Cl.
*B32B 37/00* (2006.01)
*B32B 37/14* (2006.01)
(Continued)

(52) U.S. Cl.
CPC ........ *B32B 37/0046* (2013.01); *B32B 37/142* (2013.01); *B32B 37/18* (2013.01);
(Continued)

(58) Field of Classification Search
CPC ... B32B 37/0046; B32B 37/142; B32B 37/18; B32B 2037/0061; B65H 3/0638; B65H 3/66
See application file for complete search history.

(56) References Cited

U.S. PATENT DOCUMENTS 5,217,561 A * 6/1993 Ueda ................... B32B 38/0036
219/508
6,409,872 B1 6/2002 Campion et al.
(Continued)

FOREIGN PATENT DOCUMENTS

CN 101072284 A 11/2007
JP H 05-228997 A 9/1993
(Continued)

OTHER PUBLICATIONS

Communication dated Oct. 9, 2021 by the Chinese Patent Office for Chinese Patent Application No. CN 202010324570.1.
(Continued)

*Primary Examiner* — Francisco W Tschen

*Assistant Examiner* — Abhishek A Patwardhan
(74) *Attorney, Agent, or Firm* — Harness, Dickey & Pierce L.L.C.

(57) ABSTRACT

A sheet separation device includes a rotator, a nipping member to nip the two-ply sheet with the rotator, a first conveyor to convey the two-ply sheet in a first direction toward the rotator and a second direction reverse thereto, a winding member to wind the two-ply sheet around the rotator, a second conveyor to convey a sheet medium in the second direction, a separation claw to move in a width direction; a sheet guide to guide the separated two sheets to different passages; and control circuitry. The first conveyor conveys the two-ply sheet to the rotator with a bonded portion at an upstream end. The control circuitry inserts the separation claw into a space between the two sheets, adjusts a projection amount of the two-ply sheet from a nip of the first conveyor in the second direction, and inserts the sheet medium in two-ply sheet adjusted in the projection amount.

14 Claims, 24 Drawing Sheets

(51) Int. Cl.
    *B65H 3/66*      (2006.01)
    *B32B 37/18*     (2006.01)
    *B65H 3/06*      (2006.01)
(52) U.S. Cl.
    CPC ............. *B65H 3/0638* (2013.01); *B65H 3/66* (2013.01); *B32B 2037/0061* (2013.01)

(56) References Cited

U.S. PATENT DOCUMENTS

| | | | |
|---|---|---|---|
| 6,893,521 B2* | 5/2005 | Sasaki | B32B 37/185 |
| | | | 156/367 |
| 7,946,326 B2* | 5/2011 | Lee | B65H 5/305 |
| | | | 156/367 |
| 11,053,090 B1* | 7/2021 | Noviello | H04N 1/00039 |
| 2004/0033095 A1* | 2/2004 | Saffari | G07F 17/3202 |
| | | | 400/120.01 |
| 2004/0188023 A1 | 9/2004 | Sasaki et al. | |
| 2005/0079968 A1* | 4/2005 | Trovinger | B65H 45/142 |
| | | | 493/356 |
| 2007/0264062 A1 | 11/2007 | Jinza et al. | |
| 2011/0073234 A1 | 3/2011 | Lee et al. | |
| 2011/0248440 A1* | 10/2011 | Sugiyama | G03G 15/6552 |
| | | | 271/272 |
| 2016/0257100 A1* | 9/2016 | Tachibana | B32B 37/0053 |
| 2017/0021603 A1* | 1/2017 | Kikuchi | B32B 37/182 |
| 2017/0341885 A1 | 11/2017 | Suzuki et al. | |
| 2018/0259895 A1 | 9/2018 | Shirasaki et al. | |
| 2019/0284012 A1 | 9/2019 | Yoneyama et al. | |

FOREIGN PATENT DOCUMENTS

| | | |
|---|---|---|
| JP | 2001-171004 A | 6/2001 |
| JP | 2006-160429 A | 6/2006 |
| JP | 2011-068115 A | 4/2011 |
| JP | 2017-132559 A | 8/2017 |

OTHER PUBLICATIONS

U.S. Appl. No. 16/747,225, filed Jan. 20, 2020 Tomohiro Furushasi, et al.

U.S. Appl. No. 16/745,653, filed Jan. 17, 2020 Yakuya Morinaga, et al.

* cited by examiner

SHEET PROCESSING DEVICE FOR ADJUSTING PROJECTION OF BONDED PORTION, LAMINATOR, IMAGE FORMING APPARATUS, AND IMAGE FORMING SYSTEM

CROSS-REFERENCE TO RELATED APPLICATION

This is a continuation application of U.S. application Ser. No. 16/842,941, filed on Apr. 8, 2020, which is based on and claims priority pursuant to 35 U.S.C. § 119(a) to Japanese Patent Application No. 2019-083905, filed on Apr. 25, 2019, in the Japan Patent Office, the entire disclosure of each of which is hereby incorporated by reference herein.

BACKGROUND

Technical Field

This disclosure relates to a sheet separation device, a laminator, an image forming apparatus, and an image forming system.

Related Art

There is known a lamination technique of inserting an insertion sheet (paper, photo, etc.) between a two-ply laminate sheet or laminate film (e.g., a lamination pouch or lamination folder) in which two sheets are bound (sealed) on one side as if one sheet is folded. The two-ply laminate sheet is bonded, with the insertion sheet sandwiched therebetween, with heat and pressure.

In a conventional laminating process, a user manually inserts the insertion sheet in the two-ply sheet and then bonds the laminate sheet using a lamination machine (hereinafter simply "laminator").

However, there is an adhesive layer on the inside of the two-ply laminate sheet that tends to resist separation, thereby requiring that the user separates the two sides of the laminate sheet by hand. Another bother is accurately positioning the insertion sheet after the laminate sheet is opened. Further, the laminating process by the laminator takes about 30 to 60 seconds, and the user has to wait for the process to finish. To automate such work, there are dedicated laminators.

SUMMARY

An embodiment of this disclosure provides a sheet separation device configured to separate a two-ply sheet in which two sheets are bonded together at a portion of the two-ply sheet. The sheet separation device includes a rotator configured to rotate in forward and reverse directions; a nipping member disposed opposite the rotator and configured to nip the two-ply sheet with the rotator; a first conveyor being a pair of rotators pressed against each other and configured to convey the two-ply sheet in a first direction toward the rotator and a second direction reverse to the first direction; a winding member disposed adjacent to the rotator and configured to wind the two-ply sheet around the rotator, to create a space between the two sheets of the two-ply sheet; a second conveyor configured to convey at least one sheet medium to the first conveyor in the second direction; a separation claw disposed between the rotator and the first conveyor and configured to move in a width direction of the two-ply sheet; a sheet guide configured to guide the separated two sheets of the two-ply sheet to different passages; and control circuitry. The first conveyor conveys the two-ply sheet between the rotator and the nipping member with a bonded portion of the two-ply sheet being an upstream end of the two-ply sheet in the first direction. The control circuitry is configured to insert, in the width direction, the separation claw into the space between the two sheets of the two-ply sheet; cause the first conveyor to convey the two-ply sheet in the second direction with the separation claw inserted in the space, to separate the two sheets of the two-ply sheet; cause the first conveyor to convey the separated two sheets to the sheet guide, to open the two-ply sheet; cause the second conveyor to convey the at least one sheet medium toward an opening of the two-ply sheet in the second direction; cause the first conveyor to adjust an amount of projection of the two-ply sheet from a nip of the first conveyor in the second direction; and cause the second conveyor to insert the at least one sheet medium into the two-ply sheet adjusted in the amount of projection.

Another embodiment provides a sheet separation device configured to separate the above-described two-ply sheet. The sheet separation device includes a rotator configured to rotate in forward and reverse directions, a first conveyor being a pair of rotators pressed against each other and configured to convey the two-ply sheet in a first direction toward the rotator and a second direction reverse to the first direction, a second conveyor configured to convey at least one sheet medium to the first conveyor in the second direction, a separation claw disposed between the rotator and the first conveyor and configured to move in a width direction of the two-ply sheet, a sheet guide configured to guide the separated two sheets of the two-ply sheet to different passages, and control circuitry. The rotator includes a holder configured to hold the two-ply sheet. The holder is configured to wind the two-ply sheet around the rotator as the rotator rotates, to create a space between the two sheets of the two-ply sheet. The first conveyor conveys the two-ply sheet to the rotator with a bonded portion of the two-ply sheet being an upstream end of the two-ply sheet in the first direction. The control circuitry is configured to insert, in the width direction, the separation claw into the space between the two sheets of the two-ply sheet; cause the first conveyor to convey the two-ply sheet in the second direction with the separation claw inserted in the space, to separate the two sheets of the two-ply sheet; cause the first conveyor to convey the separated two sheets to the sheet guide, to open the two-ply sheet; cause the second conveyor to convey the at least one sheet medium toward an opening of the two-ply sheet in the second direction; cause the first conveyor to adjust an amount of projection of the two-ply sheet from a nip of the first conveyor in the second direction; and cause the second conveyor to insert the at least one sheet medium into the two-ply sheet adjusted in the amount of projection.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
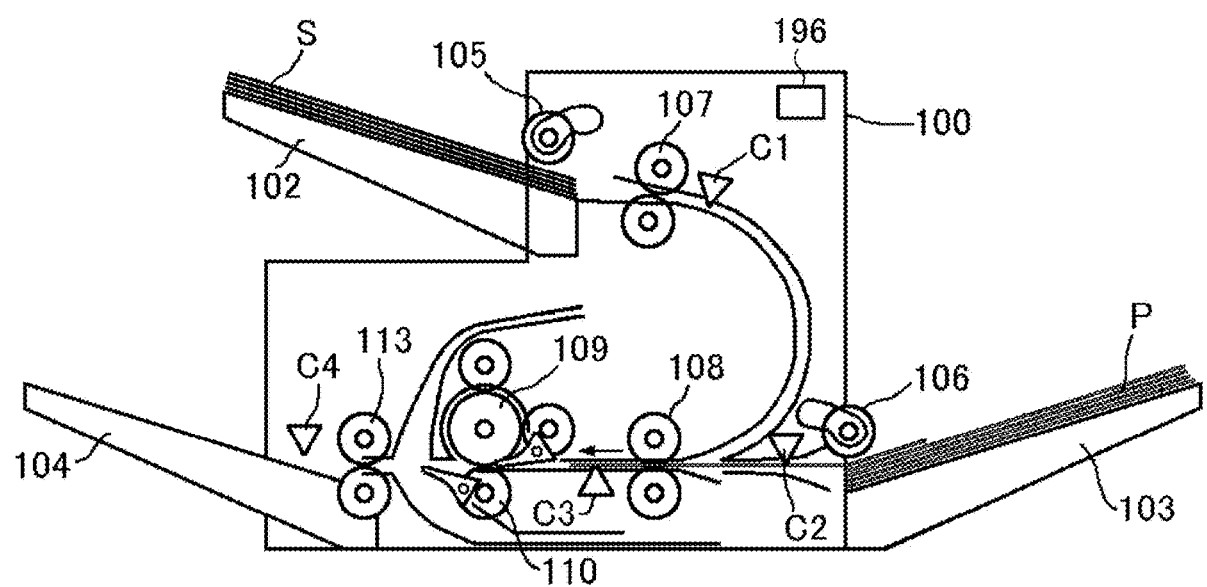
FIG. 1 is a schematic view illustrating a general arrangement of a sheet separation device according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, embodiments of this disclosure are described. As used herein, the singular forms "a," "an," and "the" are intended to include the plural forms as well, unless the context clearly indicates otherwise.

The sheet separation devices according to embodiments of this disclosure is to separate two sheets of a two-ply sheet (hereinafter referred to as a lamination sheet S) and to insert and sandwich an insertion sheet P between the separated sheets of the two-ply sheet.

The lamination sheet S is a two-ply sheet constructed of two overlapping sheets and bonded (or joined) at one portion (or on one side).

For example, there is a two-ply sheet in which a first side is a transparent sheet such as a transparent polyester sheet and the opposite side is a transparent or opaque sheet and bonded to the other sheet on one side thereof.

The insertion sheet P is an example of a sheet medium that is inserted in the two-ply sheet and can be plain paper, thick paper, postcards, envelopes, thin paper, coated paper (art paper, etc.), tracing paper, overhead projector (OHP) transparencies, and the like.

In the present specification, "separating the lamination sheet S" and "opening the two-ply lamination sheet S" signify peeling one of the two-sheets of the two-ply lamination sheet S from the other.

FIG. 1 is a schematic view illustrating a general arrangement of a sheet separation device according to one embodiment of the present disclosure. As illustrated in FIG. 1, a sheet separation device 100 includes a sheet tray 102 that is a first stacking tray on which the lamination sheets S are stacked, a pickup roller 105 that feeds the lamination sheet S from the sheet tray 102, and a conveyance roller pair 107. The sheet separation device 100 further includes a sheet feeding tray 103 that is a second stacking tray on which the insertion sheets P are stacked, and a pickup roller 106 that feeds the insertion sheets P from the sheet feeding tray 103.

In a conveyance direction of the lamination sheet S, a sheet sensor C1 is disposed downstream from the conveyance roller pair 107. The sheet sensor C1 detects an end of the lamination sheet S in the conveyance direction, thereby detecting the position of the lamination sheet S being conveyed. In a conveyance direction of the insertion sheet P, a sheet sensor C2 is disposed downstream from the pickup roller 106. The sheet sensor C2 detects an end of the insertion sheet S in the conveyance direction, thereby detecting the position of the insertion sheet P being conveyed.

The sheet separation device 100 further includes an entrance roller pair 108, a winding roller 109 as a rotator, a driven roller 110 as a nipping member described later, an exit roller pair 113, an output tray 104, and the like, downstream from the conveyance roller pair 107 and the pickup roller 106 in the conveyance direction of the lamination sheet S and the insertion sheet P. The winding roller 109 and the driven roller 110 are paired as a roller pair. Downstream from the entrance roller pair 108 in the conveyance direction, a sheet sensor C3 is disposed to detect the end of the lamination sheet S and the end of the insertion sheet P, thereby detecting the position of the lamination sheet S and the insertion sheet P being conveyed. Downstream from the exit roller pair 113 in the conveyance direction, a sheet sensor C4 is disposed to detect the end of the lamination sheet S, thereby detecting the position of the lamination sheet S being conveyed.

The pickup roller 105, the conveyance roller pair 107, the entrance roller pair 108, and the roller pair constructed of the winding roller 109 and the driven roller 110 are examples of a first feeder to feed a two-ply sheet. The pickup roller 106, the entrance roller pair 108, and the roller pair constructed of the winding roller 109 and the driven roller 110 are examples of a second feeder. The sheet separation device 100 further includes a controller 196 including a central processing unit (CPU) and the like. The controller 196 controls the operation of the sheet separation device 100 and performs control operation, determination, and the like described later.

As illustrated in FIG. 1, in the sheet separation device 100 according to the present embodiment, the lamination sheets S and the insertion sheets P are stacked on separate trays and fed between the roller pair constructed of the winding roller 109 and the driven roller 110 and further to the exit roller pair 113. As will be described later, in a state where the lamination sheet S is between the exit roller pair 113 and the roller pair constructed of the winding roller 109 and the driven roller 110, the insertion sheet P is inserted into the two-ply lamination sheet S being opened. Then, the exit roller pair 113 ejects and stacks the lamination sheet S, in which the insertion sheet P is inserted, onto the output tray 104. The configuration and operation thereof are described in detail below.

Figure 2:
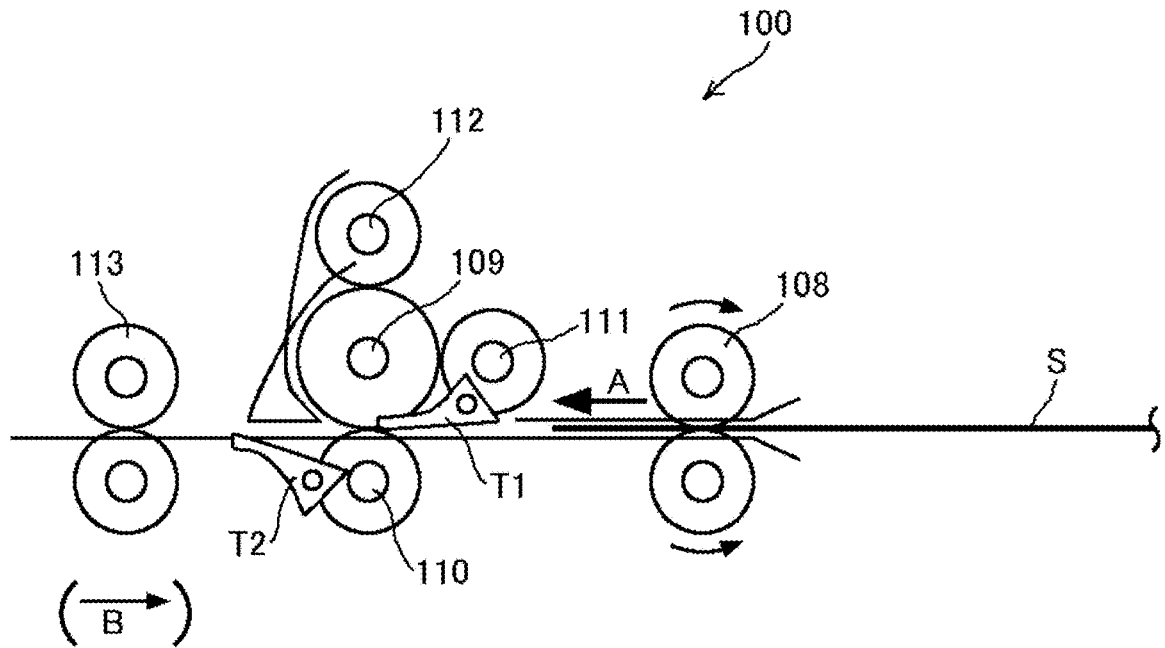
FIG. 2 is a view of a main part of the sheet separation device illustrated in FIG. 1.

FIG. 2 is a view illustrating a main part of the sheet separation device illustrated in FIG. 1. As illustrated in FIG. 2, the sheet separation device 100 includes the exit roller pair 113 serving as a conveyor. The exit roller pair 113 conveys the lamination sheet S between the roller pair of the winding roller 109 and the driven roller 110.

Each of the entrance roller pair 108 and the exit roller pair 113 is, for example, two rollers paired with each other. Driven by a driver (a motor or the like), the entrance roller pair 108 rotates in one direction, whereas the exit roller pair 113 rotates in forward and reverse directions, thereby nipping and conveying the lamination sheet S and the insertion sheet P.

The entrance roller pair 108 conveys the lamination sheet S and the insertion sheet P toward the exit roller pair 113. The conveyance direction indicated by arrow A is referred to as a forward conveyance direction or direction A (a second direction).

By contrast, the exit roller pair 113 can switch the direction of rotation between the forward direction and the reverse direction. The exit roller pair 113 can convey the nipped lamination sheet S in the forward conveyance direction toward the output tray 104 (see FIG. 1) and the reverse direction in which the lamination sheet S is drawn back toward the winding roller 109. The conveyance direction toward the winding roller 109 (the direction indicated by arrow B and reverse to the forward conveyance direction) is referred to as the reverse conveyance direction or direction B (a first direction toward a rotator).

Between the entrance roller pair 108 and the exit roller pair 113, the sheet separation device 100 further includes the winding roller 109 that is the rotator and the driven roller 110 that is the nipping member. The driven roller 110 rotates with the winding roller 109.

Driven by a driver (motor or the like), the winding roller 109 rotates in the forward and reverse directions, and the direction of rotation can be switched between the forward direction and the reverse direction (clockwise and counterclockwise). The driven roller 110 is in contact with the winding roller 109, forming a nip therewith. The winding roller 109 and the driven roller 110 nip and convey the lamination sheet S and the insertion sheet P.

The sheet separation device 100 further includes, as second members, grip rollers 111 and 112 disposed at a predetermined interval around the circumference or periphery (outer circumferential surface) of the winding roller 109, which is orthogonal to the rotation axis of the winding roller 109. The sheet separation device 100 further includes bifurcating claws T1 and T2 to switch the conveyance direction of the lamination sheet S.

The plurality of grip rollers 111 and 112 is in contact with the winding roller 109 and rotates with the winding roller 109. The grip rollers 111 and 112, together with the winding roller 109, nip (grip) the lamination sheet S and wind the lamination sheet S around the winding roller 109.

The bifurcating claw T1 is disposed between the entrance roller pair 108 and the winding roller 109. the bifurcating claw T2 is disposed between the winding roller 109 and the exit roller pair 113. The positions (orientations) of the bifurcating claws T1 and T2 can be changed by a driver (a motor or the like), and the conveyance direction of the lamination sheet S can be changed.

The grip rollers 111 and 112 and the bifurcating claws T1 and T2 are examples of winding members to wind the lamination sheet S around the winding roller 109.

With reference to FIGS. 1 to 14, a description is given of a series of operations of the sheet separation device 100, that is, operations from separation of the lamination sheet S to insertion of the insertion sheet P. In FIGS. 3 to 14, elements identical to those illustrated in FIG. 1 or 2 are given identical reference numerals, and the descriptions thereof are omitted.

As illustrated in FIG. 1, in the sheet separation device 100 according to the present embodiment, the lamination sheets S, in each of which two sheets are bonded partly, are stacked on the sheet tray 102. The lamination sheets S are stacked with the bonded portion at the downstream end in the direction of feeding (conveyance direction) of the pickup roller 105. The pickup roller 105 picks up the lamination sheet S from the sheet tray 102, and the conveyance roller pair 107 conveys the lamination sheet S toward the entrance roller pair 108.

Next, as illustrated in FIG. 2, the lamination sheet S is conveyed by the entrance roller pair 108 toward the nip between the winding roller 109 and the driven roller 110. At this time, the bifurcating claws T1 and T2 are positioned above and below the conveyance passage of the lamination sheet S. The bifurcating claw T1 guides the lamination sheet S from the entrance roller pair 108 between the winding roller 109 and the driven roller 110. The bifurcating claw T2 guides the lamination sheet S from between the winding roller 109 and the driven roller 110 to the exit roller pair 113.

In the present embodiment, ends of the two sheets of the lamination sheet S are bonded together on one of the four sides, and the sheet separation device 100 conveys the lamination sheet S with the bonded side on the downstream side in the forward conveyance direction (direction A).

Figure 3:
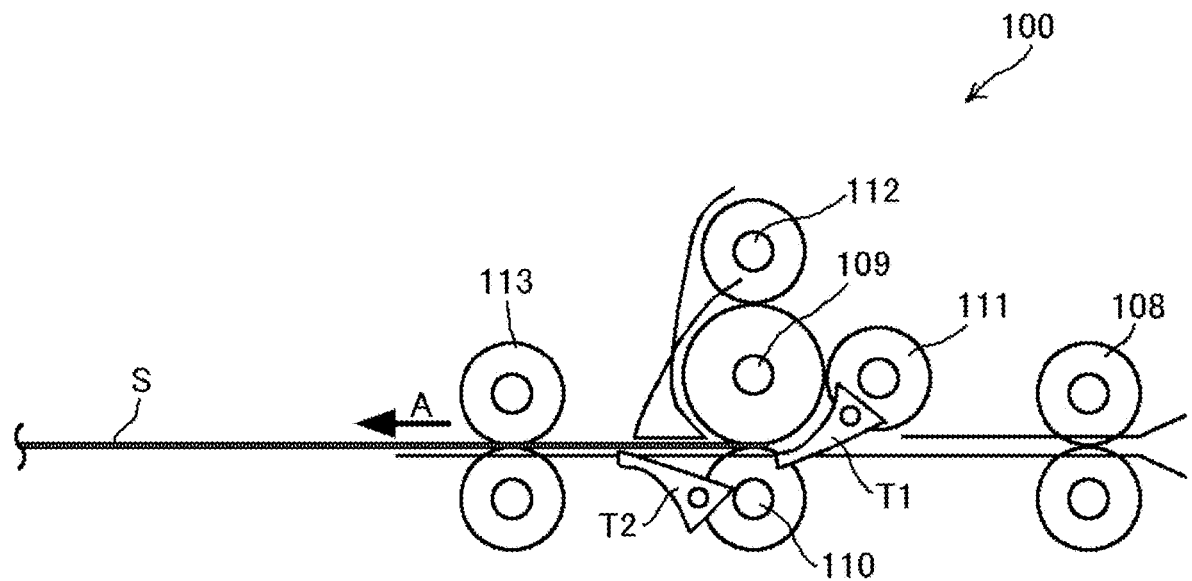
FIG. 3 is a view of the main part of the sheet separation device illustrated in FIG. 1, conveying a lamination sheet in a forward direction.

Subsequently, as illustrated in FIG. 3, the sheet separation device 100 suspends conveyance of the lamination sheet S after the rear end of the lamination sheet S in the forward conveyance direction passes the bifurcating claw T1. For example, when the rear end is nipped between the winding roller 109 and the driven roller 110, the sheet separation device 100 suspends conveyance. At the same time, the bifurcating claw T1 moves (rotates) counterclockwise in the drawing around the rotation axis as a fulcrum, to form a passage (i.e., a winding passage) to guide the rear end of the lamination sheet S around the winding roller 109. These actions can be triggered by the detection of position of the lamination sheet S by the sheet sensor C3 (see FIG. 1).

Figure 4:
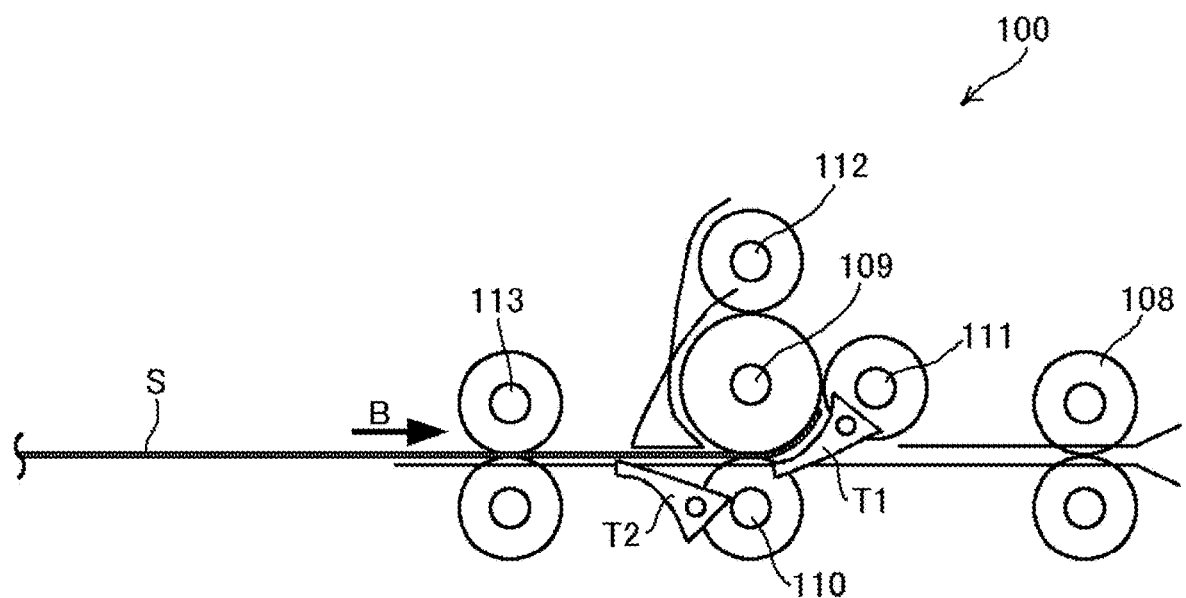
FIG. 4 is a view of the main part of the sheet separation device illustrated in FIG. 1, conveying the lamination sheet in a reverse direction.

Next, as illustrated in FIG. 4, the exit roller pair 113 and the winding roller 109 reverse the rotation direction and convey the lamination sheet S in the reverse conveyance direction (direction B). Then, the lamination sheet S is guided around the winding roller 109 by the bifurcating claw T1. That is, the sheet separation device 100 winds the lamination sheet S around the winding roller 109 from the side where the two overlapping sheets of the lamination sheet S are not bonded. At that time, the exit roller pair 113 (the first conveyor) conveys the lamination sheet S toward the winding roller 109 (i.e., in a direction toward the rotator).

Figure 5:
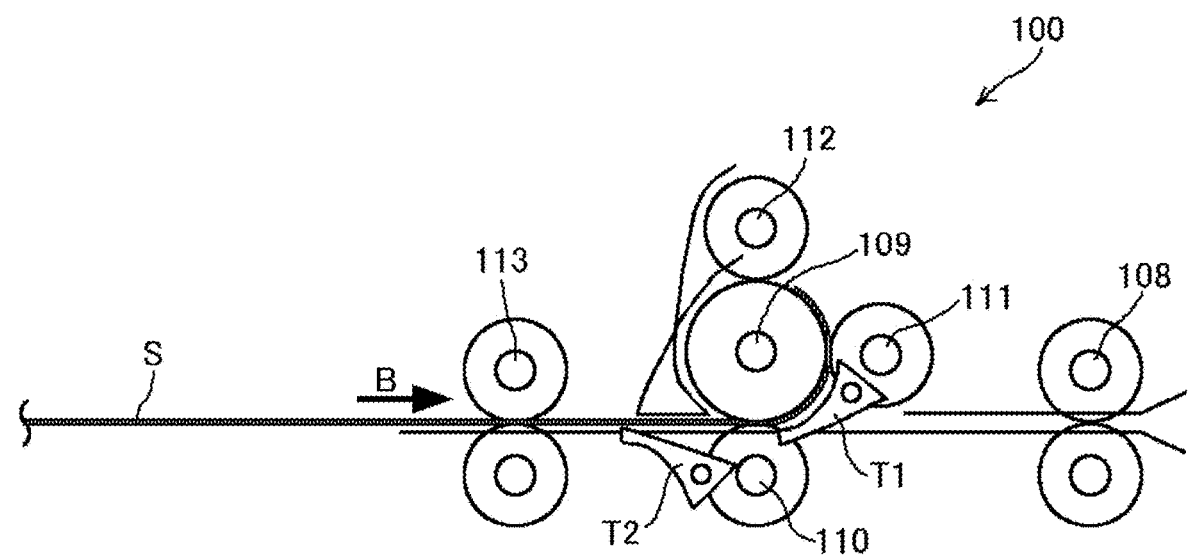
FIG. 5 is a view of the main part of the sheet separation device illustrated in FIG. 1, winding the lamination sheet around a winding roller.
Figure 6:
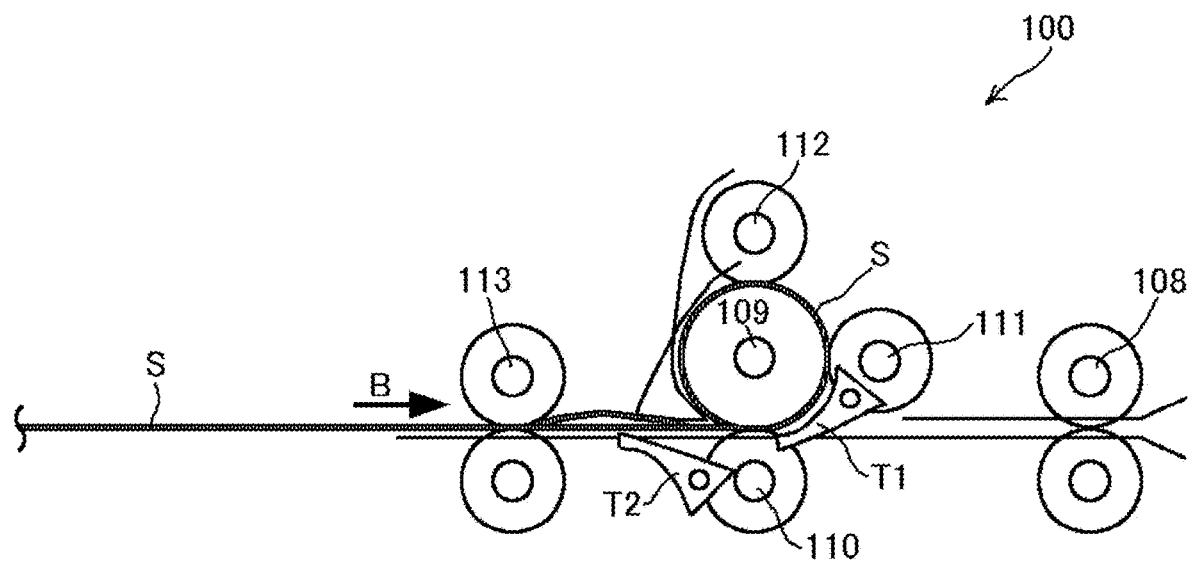
FIG. 6 is another view of the main part of the sheet separation device illustrated in FIG. 1, winding the lamination sheet around the winding roller.
Figure 7:
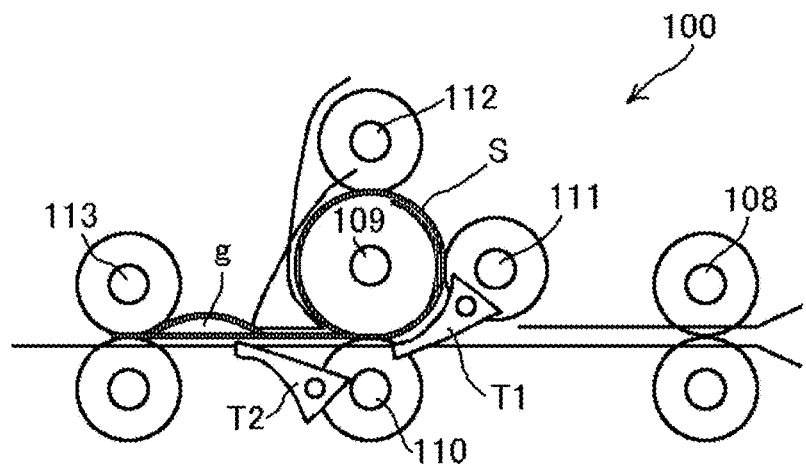
FIG. 7 is another view of the main part of the sheet separation device illustrated in FIG. 1, winding the lamination sheet around the winding roller.

FIGS. 5 to 7 illustrate a process of winding the lamination sheet S around the winding roller 109. The grip rollers 111 and 112 nip the fed lamination sheet S with the winding roller 109 and wind the lamination sheet S around the circumference of the winding roller 109 (see FIG. 5).

When the lamination sheet S is wound around the winding roller 109 over the entire circumference or greater, the end (the unbonded side of the lamination sheet S) of the lamination sheet S is secured to the winding roller 109. As the lamination sheet S is further wound around the winding roller 109, a difference in the circumferential length (a difference in winding amount) is created between the inner peripheral side sheet of the two-ply lamination sheet S and the outer peripheral side sheet thereof. Then, between the exit roller pair 113 and the winding roller 109, the lamination sheet S begins to separate (i.e., a gap starts appearing in the lamination sheet S), as illustrated in FIG. 6.

Then, as illustrated in FIG. 7, the slack in the inner sheet gathers between the exit roller pair 113 and the winding roller 109, and a gap g (space) is created between the inner sheet and the outer sheet.

As described above, the sheet separation device 100 according to the present embodiment winds the lamination sheet S around the winding roller 109, thereby creating a difference in winding circumferential length between the inner sheet and the outer sheet from a geometrical relationship. Thus, the lamination sheet S can be reliably separated.

Subsequently, a description is given of, in the sheet separation device 100 according to the present embodiment, additional configuration and the operation thereof. The additional configuration is for separating the lamination sheet S entirely between the bonded side (first end) and the other side (second end) and inserting the insertion sheet P therein. The second end is an opening end opposed to the bonded side.

Figure 8:
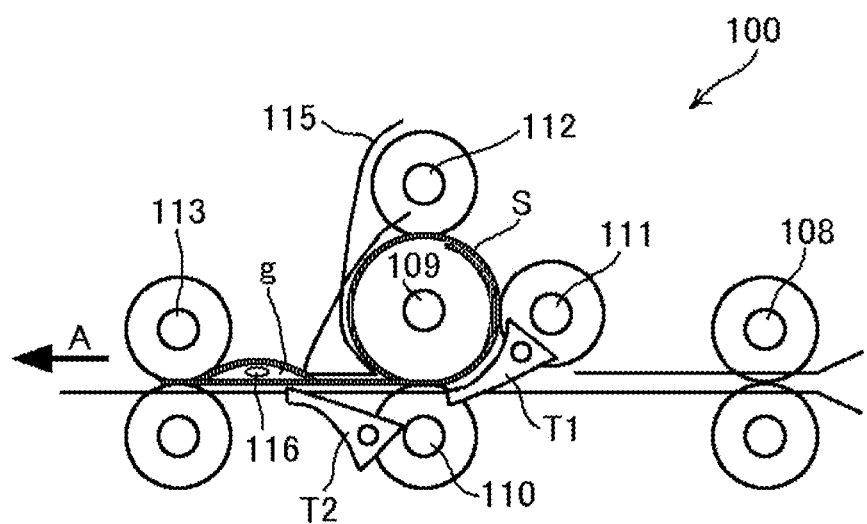
FIG. 8 is a view of the main part of the sheet separation device illustrated in FIG. 1, inserting a separation claw into a gap of the lamination sheet.

As illustrated in FIG. 8, the sheet separation device 100 according to the present embodiment further includes a sheet guide 115 and separation claws 116. The sheet guide 115 is a passage member that defines a conveyance passage and guides one of the separated sheets of the lamination sheet S. The separation claws 116 are disposed on both sides in the width direction of the lamination sheet S and movable in the width direction. The sheet separation device 100 can insert the separation claws 116 into the gap g generated in the lamination sheet S from both sides in the width direction.

Figure 9:
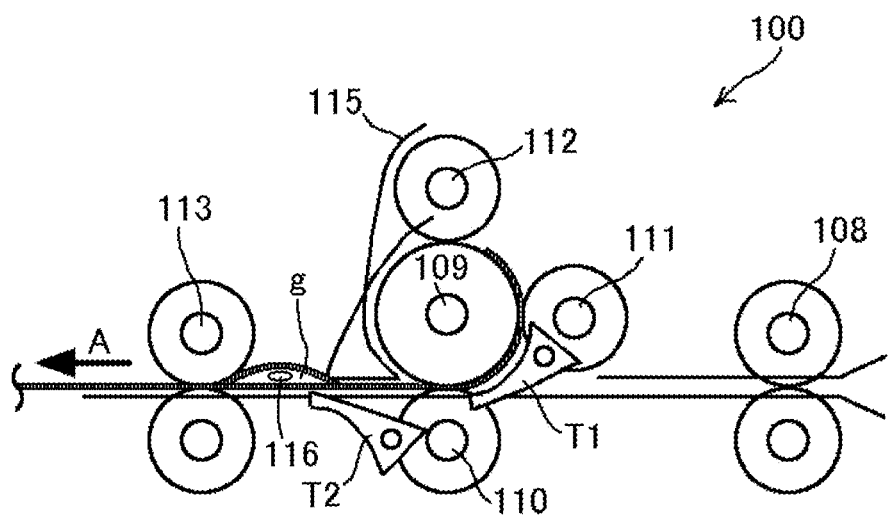
FIG. 9 is a view of the main part of the sheet separation device illustrated in FIG. 1, in which an exit roller pair rotates in the reverse direction with the separation claw inserted in the gap of the lamination sheet.
Figure 10:
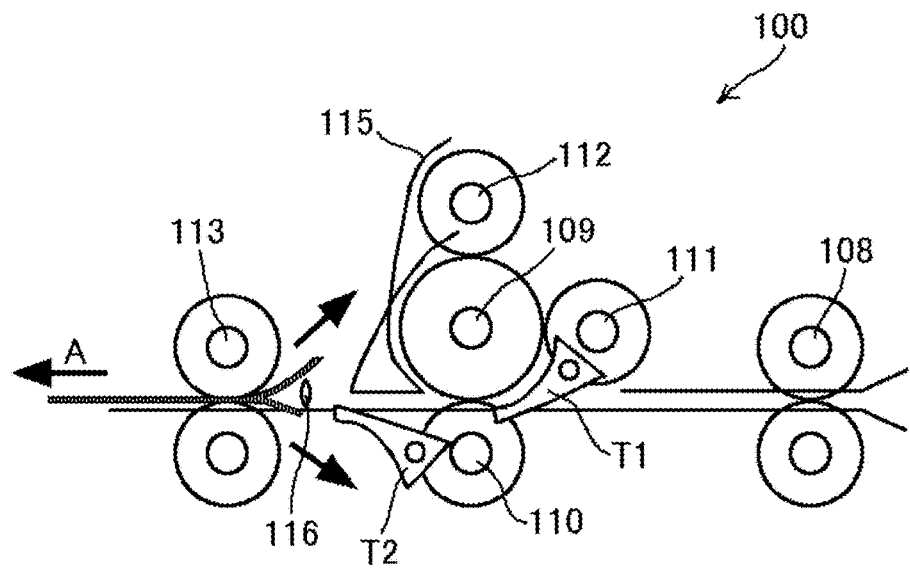
FIG. 10 is a view of the main part of the sheet separation device illustrated in FIG. 1, separating the lamination sheet.

As illustrated in FIG. 9, the sheet separation device 100 rotates the exit roller pair 113 to convey the lamination sheet S in the forward conveyance direction (direction A) with the separation claws 116 inserted in the gap g. Then, as illustrated in FIG. 10, when the separation claws 116 reach the rear end of the lamination sheet S in the conveyance direction, the rear end (opening) of the lamination sheet S can be separated.

The separation claws 116 are described further.

Figure 15:
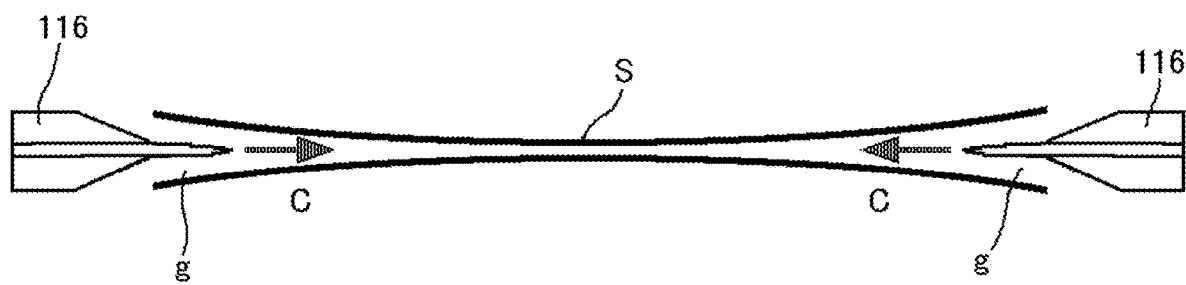
FIG. 15 is a schematic view of the separation claw of the sheet separation device.
Figure 16:
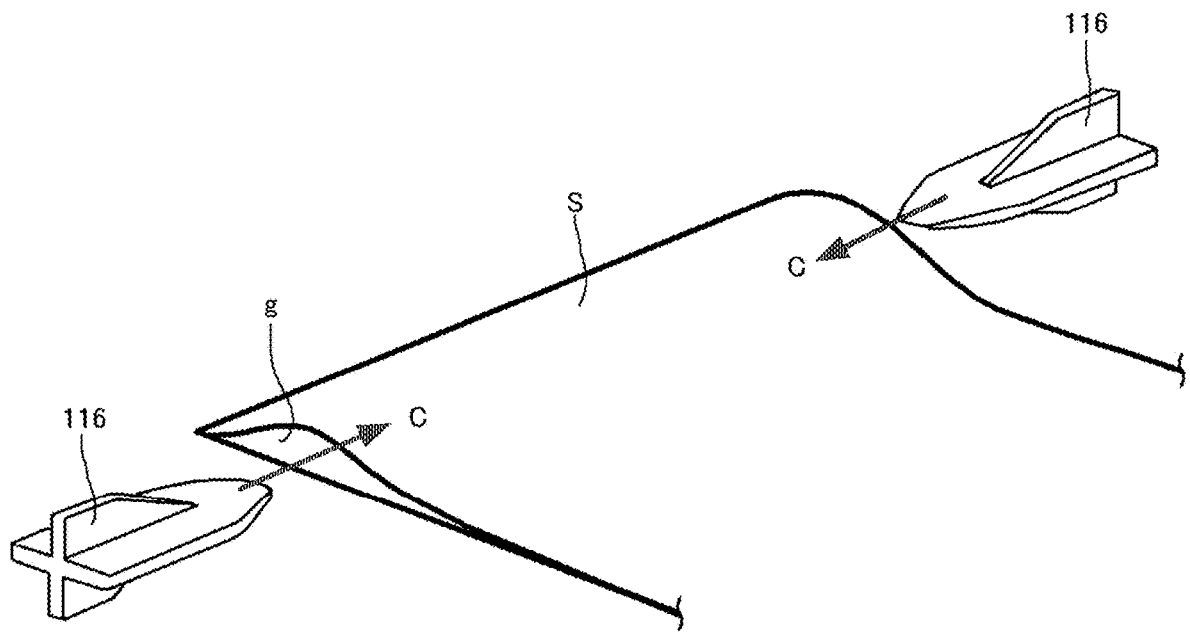
FIG. 16 is a perspective view illustrating how the separation claw separates two sheets of the lamination sheet from each other.
Figure 17:
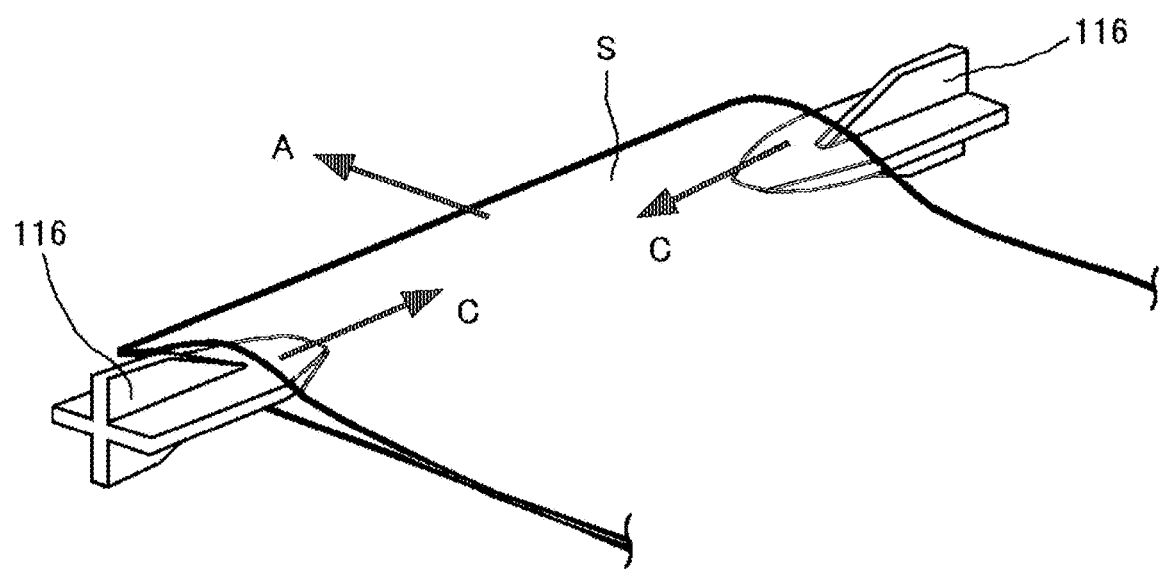
FIG. 17 is another perspective view illustrating how the separation claw separates the two sheets of the lamination sheet from each other.
Figure 18:
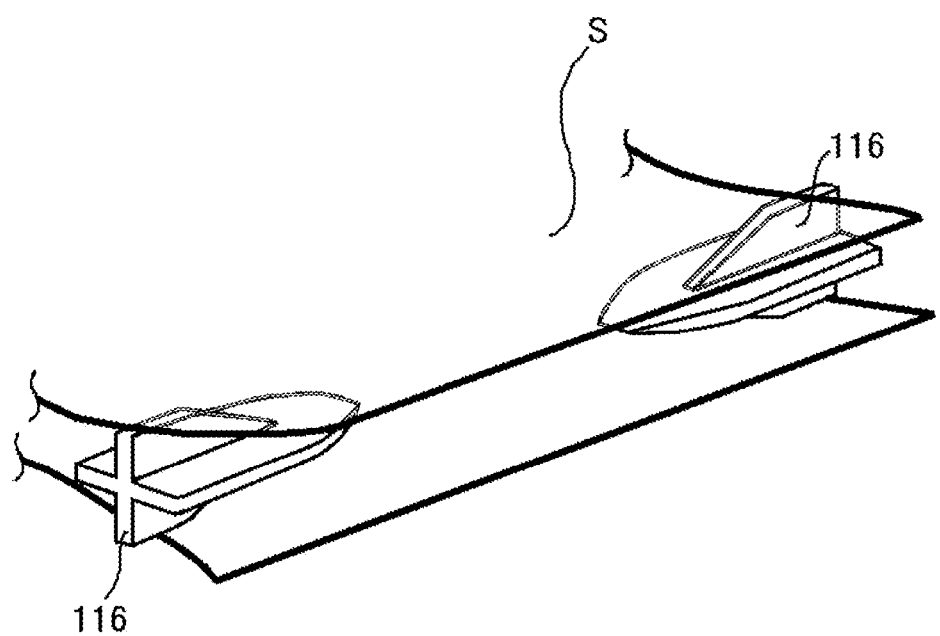
FIG. 18 is another perspective view illustrating how the separation claw separates the two sheets of the lamination sheet from each other.

FIG. 15 is a schematic view of the separation claws in the sheet separation device. FIGS. 16 to 18 are perspective views illustrating how the separation claws separate the two sheets of the lamination sheet S from each other.

As illustrated in these drawings, each separation claw 116 has a shape that gradually rises from the front end to the rear end in the insertion direction (indicated by arrow C). Thus, the separation claws 116 can be smoothly inserted into the gap g generated in the lamination sheet S.

Additionally, as the lamination sheet S is conveyed in the forward conveyance direction (indicated by arrow A) after the separation claws 116 are inserted into the gap g (see FIGS. 16 and 17), the lamination sheet S can be reliably separated to the rear end thereof (see FIG. 18).

Alternatively, the sheet separation device 100 can include only a single separation claw 116, and the separation claw 116 is inserted into only one side of the lamination sheet S. Moreover, the shape of the separation claw 116 is not limited to that illustrated in the drawing. For example, the separation claw 116 can be elliptical or configured to be able to rotate by 90 degrees.

Returning back to FIG. 10, the description is continued below. In the sheet separation device 100, after the exit roller pair 113 conveys the lamination sheet S in the forward conveyance direction (direction A) and separates the lamination sheet S, the bifurcating claw T2 moves (rotates) clockwise around the rotation shaft as a fulcrum and closes the conveyance passage along which the lamination sheet S has been conveyed so far.

Figure 11:
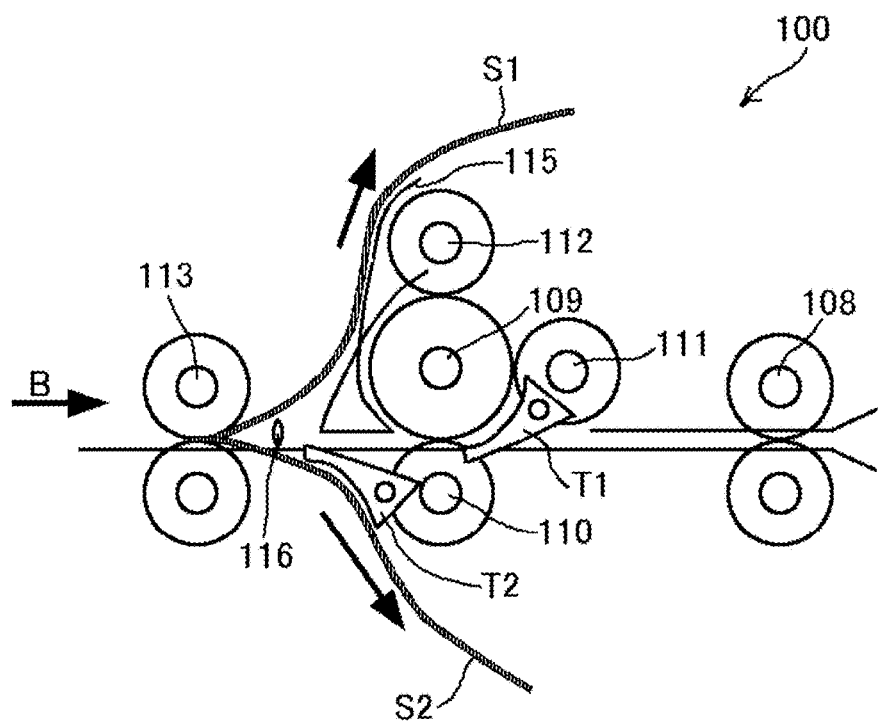
FIG. 11 is a view of the main part of the sheet separation device illustrated in FIG. 1, in which the exit roller pair rotates in the reverse direction with the lamination sheet separated.

Next, as illustrated in FIG. 11, the exit roller pair 113 reverses the rotation, and conveys the lamination sheet S in the reverse conveyance direction (direction B). Then, the two separated sheets of the lamination sheet S (hereinafter referred to as an upper sheet S1 and a lower sheet S2) are guided in different directions. That is, the upper sheet S1 is conveyed along the sheet guide 115, and the lower sheet S2 is conveyed along the bifurcating claw T2 that also serves as a sheet guide. As illustrated in the drawing, the lamination sheet S opens wide to the bonded side as one end.

Figure 12:
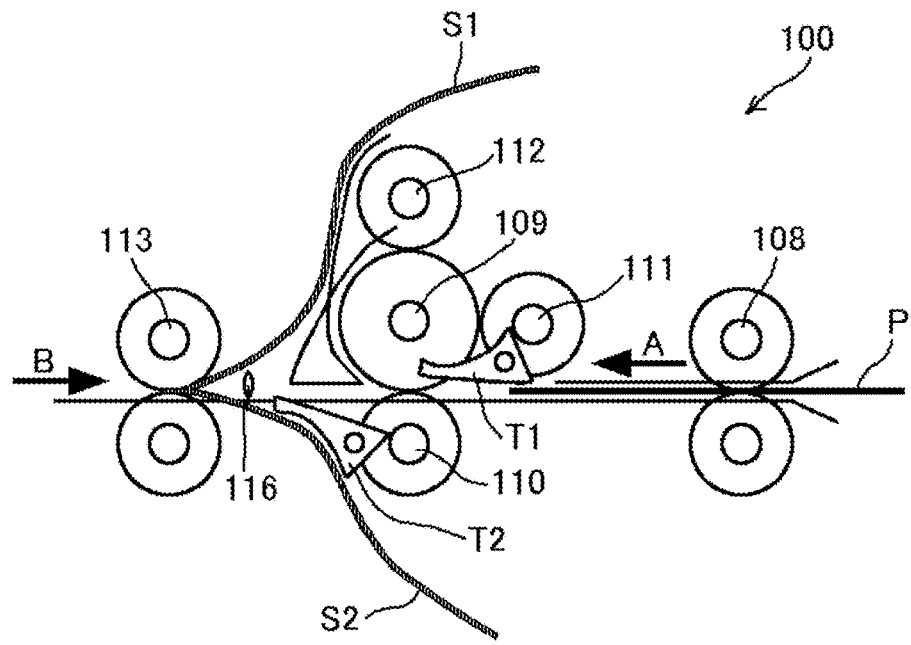
FIG. 12 is a view of the main part of the sheet separation device illustrated in FIG. 1, in which an entrance roller pair conveys an insertion sheet in the forward direction.

Subsequently, as illustrated in FIG. 12, the exit roller pair 113 conveys the lamination sheet S to the designated position in the reverse conveyance direction (direction B) and waits. Meanwhile, the entrance roller pair 108 that is the second feeder conveys the insertion sheet P from the sheet feeding tray 103 (see FIG. 1) toward the exit roller pair 113 in the forward conveyance direction (direction A). At this time, the bifurcating claw T1 is positioned above the conveyance passage, and the insertion sheet P passes below the bifurcating claw T1.

Figure 13:
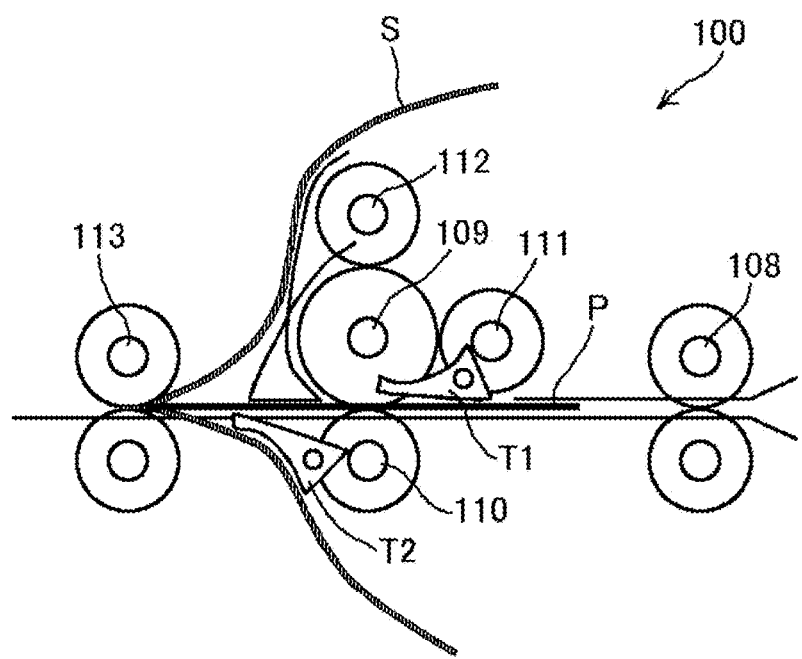
FIG. 13 is a view of the main part of the sheet separation device illustrated in FIG. 1, inserting the insertion sheet in the separated lamination sheet.

Next, as illustrated in FIG. 13, the insertion sheet P is inserted into the opened lamination sheet S. These operations can be triggered by the sheet position detection by the sheet sensor C4 (see FIG. 1).

Figure 14:
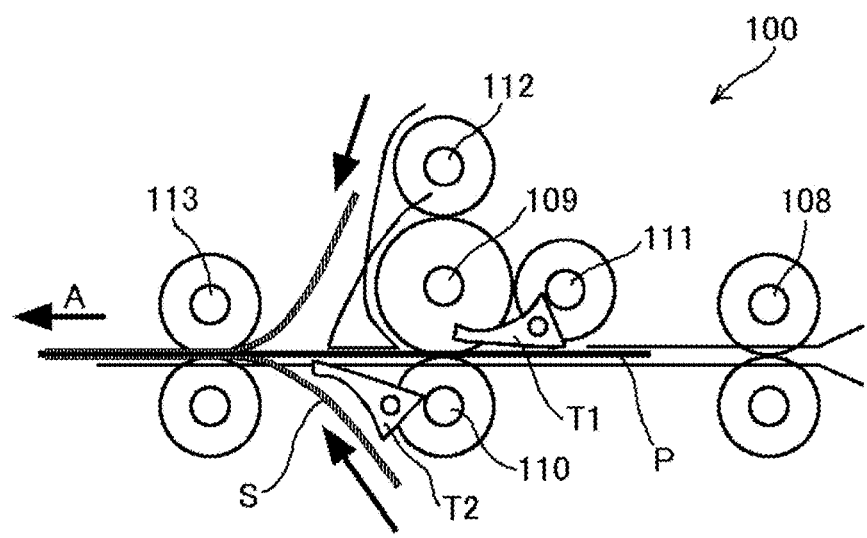
FIG. 14 is a view of the main part of the sheet separation device illustrated in FIG. 1, conveying the lamination sheet in the forward direction with the insertion sheet inserted therein.

As illustrated in FIG. 14, as the exit roller pair 113 conveys the lamination sheet S in which the insertion sheet P is inserted in the forward conveyance direction (direction A), the two sheets are again overlaid one on another, and the opening is closed. Then, the sheet separation device 100 ejects and stacks the lamination sheet S sandwiching the insertion sheet P onto the output tray 104 (FIG. 1) with the exit roller pair 113, or a roller or the like, positioned downstream from the exit roller pair 113.

Figure 19:
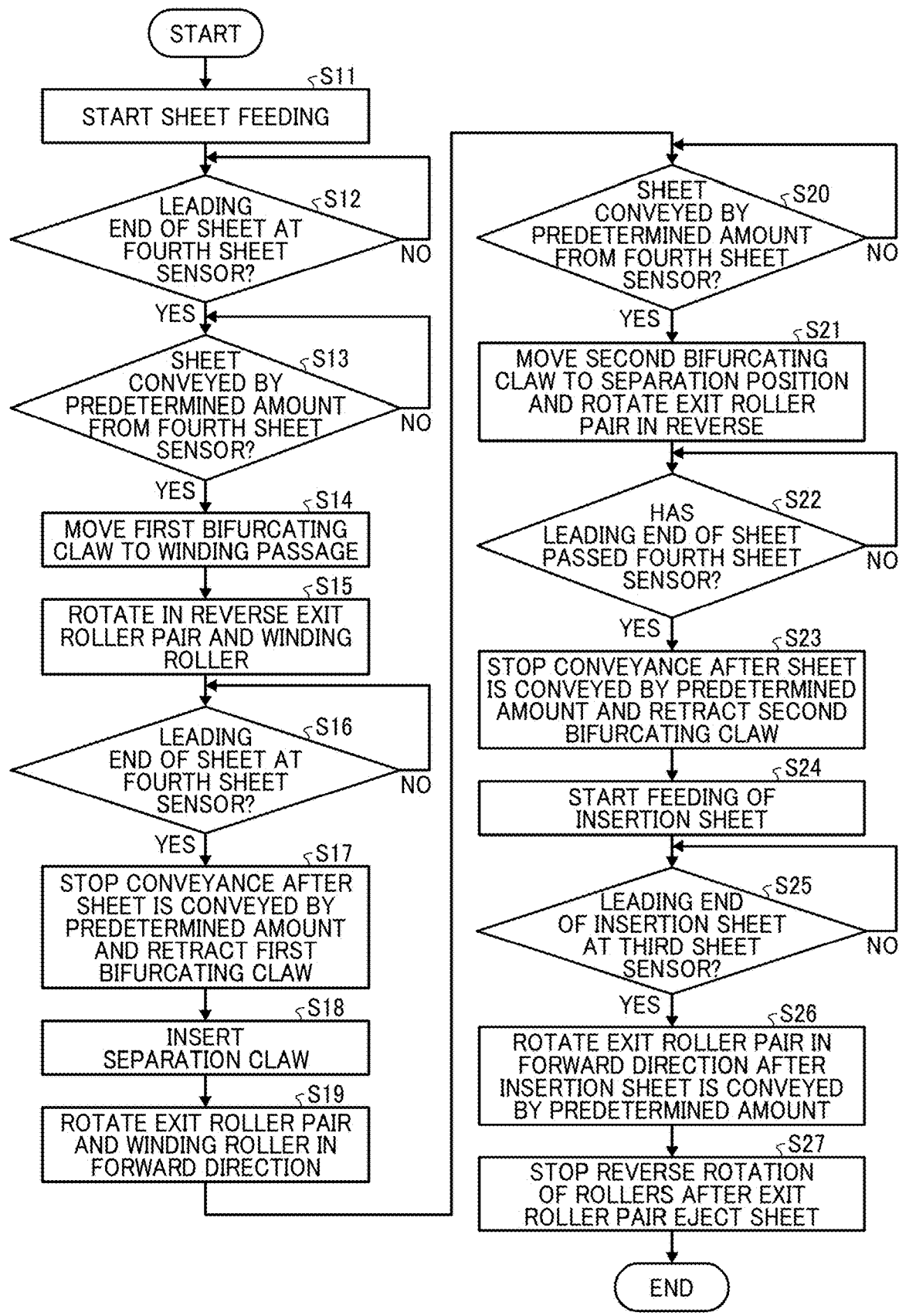
FIG. 19 is a flowchart illustrating a series of operations from sheet feeding to completion of inserting of the insertion sheet.

FIG. 19 is a flowchart illustrating a series of operations from sheet feeding to completion of inserting of the insertion sheet. The description below proceeds while indicating the reference numerals indicated in the flowchart.

In S11, the sheet separation device 100 starts feeding the lamination sheet S (see FIG. 1). In S12, the sheet separation device 100 determines whether the end of the lamination sheet S has arrived at the sheet sensor C4 as a fourth sensor (see FIG. 2). In S13, in response to a determination that the lamination sheet S has been conveyed by a predetermined amount from the sheet sensor C4 (the fourth sensor), in S14, the sheet separation device 100 moves the bifurcating claw T1 (a first bifurcating claw) to the position to guide the lamination sheet S along the winding passage (see FIG. 3). For example, the predetermined amount is stored in a memory by a manufacturer based on empirical data.

In S15, the sheet separation device 100 rotates the winding roller 109 in the reverse direction and winds the lamination sheet S around the winding roller 109 (see FIGS. 4 to 7). In S16, the sheet separation device 100 determines whether the end of the lamination sheet S has arrived at the sheet sensor C4 (the fourth sensor). In S17, the sheet separation device 100 stops conveyance of the lamination sheet S after the lamination sheet S is conveyed from the sheet sensor C4 by a predetermined amount, and retracts the bifurcating claw T1 (the first bifurcating claw) to a home position. In S18, the separation claws 116 are inserted into the gap g generated as the lamination sheet S is separated (see FIG. 8).

In S19, the sheet separation device 100 rotates the exit roller pair 113 and the winding roller 109 in the forward direction, and conveys the lamination sheet S in the forward conveyance direction. As a result, the sheets of the lamination sheet S are separated from each other to the rear end in the conveyance direction (see FIGS. 9 and 10).

In response to a determination made in S20 that the lamination sheet S has been conveyed by the predetermined amount from the sheet sensor C4, in S21, the sheet separation device 100 moves the bifurcating claw T2 (a second bifurcating claw) to the separation position and rotates the exit roller pair 113 in the reverse direction. In S22, the sheet separation device 100 determines whether or not the end of the lamination sheet S has passed the sheet sensor C4 (see FIG. 11).

In S23, the sheet separation device 100 stops conveyance of the lamination sheet S after the lamination sheet S is conveyed from the sheet sensor C4 by the predetermined amount, and retracts the bifurcating claw T2 (the second bifurcating claw) to the home position. At this time, the lamination sheet S is opened with the bonded side as one end (see FIG. 11).

In S24, the sheet separation device 100 starts feeding the insertion sheet P (see FIG. 12). In S25, the sheet separation device 100 determines that the end of the insertion sheet P has passed the sheet sensor C3 (a third sheet sensor). Then, in S26, the sheet separation device 100 conveys the insertion sheet P by a predetermined amount, to insert the insertion sheet P into the lamination sheet S (see FIG. 13). Then, the exit roller pair 113 is rotated in the forward direction to convey the lamination sheet S, with the insertion sheet P inserted therein, in the forward conveyance direction. Thus, the inserting completes (see FIG. 14). In S27, after the inserting completes and the lamination sheet S is ejected by the exit roller pair 113, the sheet separation device 100 stops the rotation of all rollers.

As described above, the sheet separation device 100 according to the present embodiment can open the lamination sheet S wide and insert and sandwich the insertion sheet P therein. Therefore, for example, compared with a laminator using a vacuum device, the structure is simple, and the entire apparatus can be simple and compact.

In addition, as illustrated in FIG. 1, the sheet separation device 100 according to the present embodiment can store the lamination sheets S and insertion sheet P on separate trays to be conveyed separately. Accordingly, it is not necessary to stack the lamination sheets S and the insertion sheets P in a predetermined order, for added convenience. In the present embodiment, the lamination sheets S are stacked on the sheet tray 102, and the insertion sheets P are stacked on the sheet feeding tray 103. However, where to stack the lamination sheets S and the insertion sheets P are not limited thereto. Alternatively, the insertion sheet P can be stacked on the sheet tray 102 and the lamination sheet S can be stacked on the sheet feeding tray 103.

A description is provided of an advantageous configuration of the present disclosure.

The sheet separation device 100 according to the present embodiment separates the lamination sheet S into two sheets and inserts the insertion sheet P into the opened lamination sheet S as illustrated in FIG. 13. The following four configurations are used to insert (position) the insertion sheet P at a desired position with respect to the separated lamination sheet S.

Figure 20:
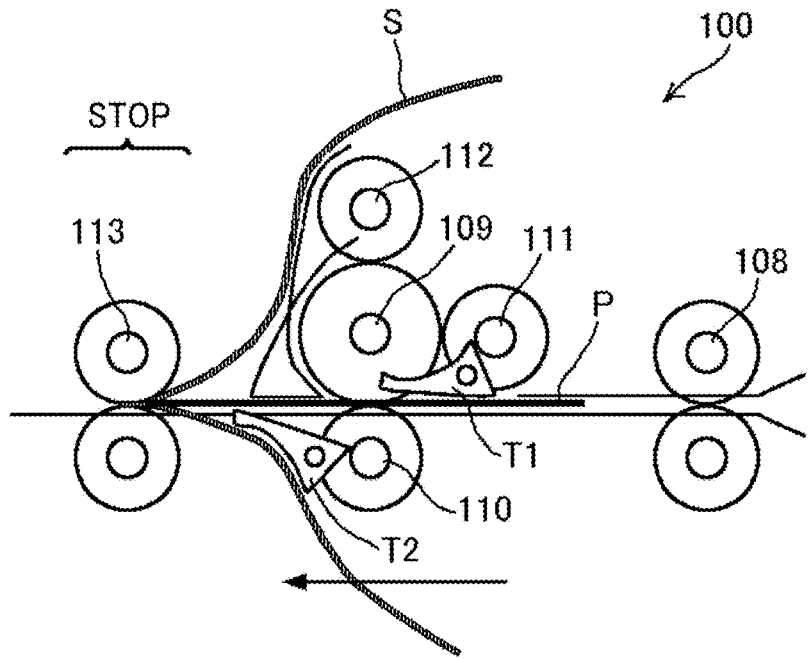
FIG. 20 is a view of the main part of the sheet separation device and illustrates a first configuration to position the insertion sheet.

A first configuration is described with reference to FIG. 20, which illustrates a main part of the sheet separation device 100. As illustrated in FIG. 20, in the sheet separation device 100, the exit roller pair 113 nips the bonded portion (jointed portion) of the lamination sheet S (holds the bonded portion in the nip) and stops. In this state, the insertion sheet P is positioned relative to the lamination sheet S, in contact with (abutting) the bonded portion (jointed portion).

The bonded portion of the lamination sheet S has a certain width in the conveyance direction of the lamination sheet S, and the opening-side end of the bonded portion is upstream from the nip of the exit roller pair 113 in the forward conveyance direction. Therefore, the insertion sheet P can be positioned relative to the lamination sheet S by placing the insertion sheet P abutting the bonded portion. Further, since the inclination of the insertion sheet P is corrected, the accuracy of the relative position (relative posture) can be improved.

With the first configuration to place the insertion sheet P abutting the bonded portion of the lamination sheet S, the insertion sheet P is positioned with respect only to the bonded portion of the lamination sheet S. Therefore, in a case where the insertion sheet P is shorter than the lamination sheet S in the conveyance direction, it is difficult to position the insertion sheet P at the center of the lamination sheet S, or arrange a plurality of insertion sheets P at equal intervals.

Such inconveniences can be solved by second to fifth configurations described below.

Figure 21:
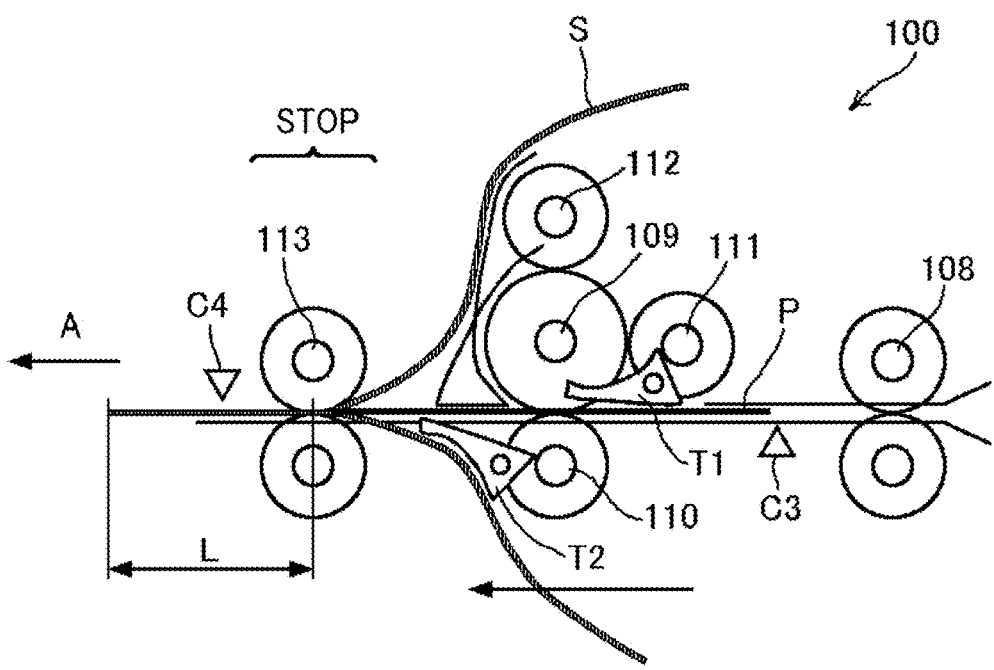
FIG. 21 is a view of the main part of the sheet separation device and illustrates a second configuration to position the insertion sheet.

A second configuration is described with reference to FIG. 21, which illustrates the main part of the sheet separation device 100. As illustrated in FIG. 21, the sheet separation device 100 includes the sheet sensor C3 that detects the conveyance position of the lamination sheet S and the insertion sheet P, and the sheet sensor C4 that detects the conveyance position of the lamination sheet S.

The sheet separation device 100 detects, with the sheet sensor C3, the leading end of the lamination sheet S conveyed in the forward conveyance direction, and stops the conveyance after the exit roller pair 113 conveys the lamination sheet S by a given distance. As the insertion sheet P contacts (specifically, an inner side of) a portion of the lamination sheet S nipped in the nip of the exit roller pair 113, the insertion sheet P is positioned relative to the lamination sheet S.

That is, the sheet separation device 100 can adjust the position (an amount of projection L) of the bonded end of the lamination sheet S in the forward conveyance direction from the nip of the exit roller pair 113 based on the detection result of the sheet sensor C3. The sheet separation device 100 inserts the insertion sheet P into the opening of the lamination sheet S adjusted in the thus. By placing the insertion sheet P in the nip of the exit roller pair 113, the inclination of the insertion sheet P can be corrected, and the relative position (relative posture) accuracy can be improved.

Therefore, for example, an insertion sheet P smaller than the lamination sheet S can be positioned at the center of the lamination sheet S.

Instead of detecting the position (projection amount) of the bonded end with the sheet sensor C3, the position (the amount of projection L) of the bonded end can be detected based on the conveyance amount (rotation amount) of the exit roller pair 113.

Figure 22:
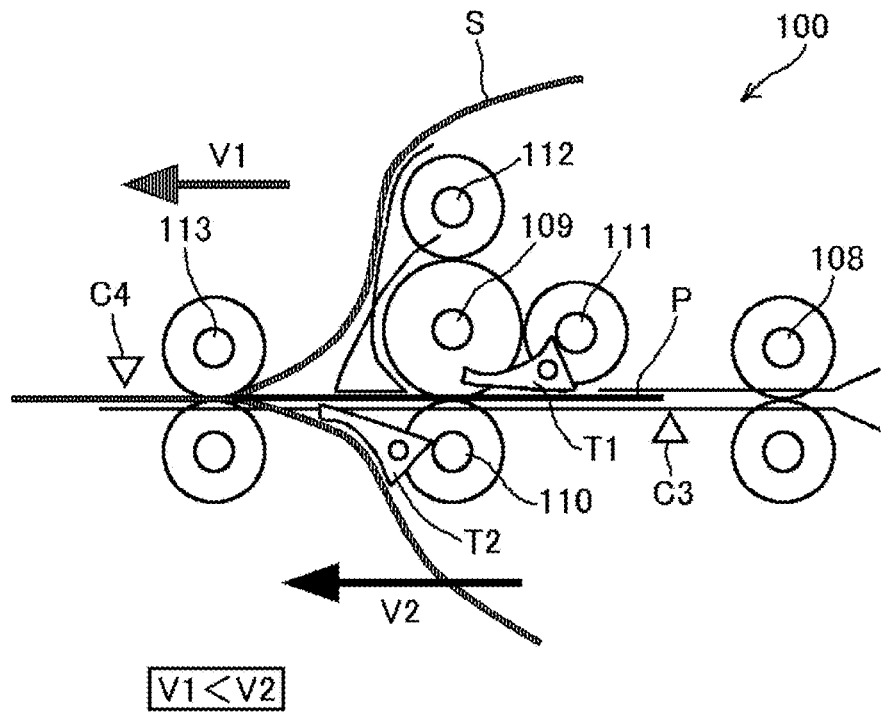
FIG. 22 is a view of the main part of the sheet separation device and illustrates a third configuration to position the insertion sheet.

A third configuration is described with reference to FIG. 22, which illustrates the main part of the sheet separation device 100. As illustrated in FIG. 22, the sheet separation device 100 conveys the insertion sheet P in the forward conveyance direction at a conveyance speed V2 higher than a conveyance speed V1 of the lamination sheet S in the forward conveyance direction (V2>V1) and keeps a difference between the conveyance speeds V1 and V2. Then, when the lamination sheet S is conveyed a given distance from the exit roller pair 113, the insertion sheet P contacts (the inner side of) the portion of the lamination sheet S nipped in the exit roller pair 113 and is positioned relative to the lamination sheet S.

After the insertion sheet P is positioned in contact with the nip of the exit roller pair 113, the controller 196 sets the conveyance speed V2 of the insertion sheet P in the forward conveyance direction equal to the conveyance speed V1 of the lamination sheet S in the forward conveyance direction.

As described above, in the third configuration, the exit roller pair 113 does not stop, which is advantageous in improving the productivity compared with the first and second configurations.

A fourth configuration is described below. In the fourth configuration, the controller 196 adjusts the timing at which the insertion sheet P joins the lamination sheet S at the nip of the exit roller pair 113, thereby adjusting the position of the insertion sheet P relative to the lamination sheet S.

Figure 23A:
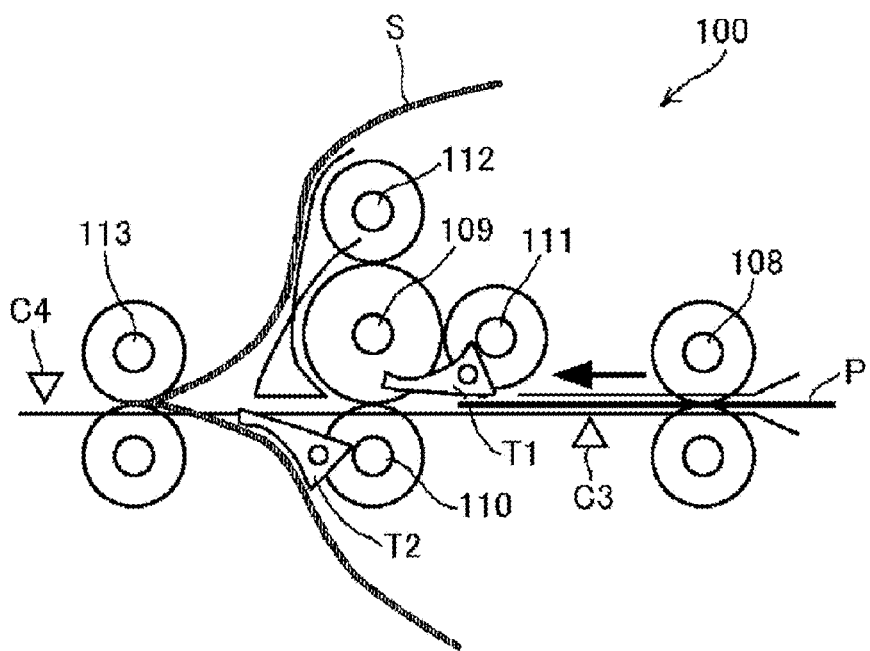
FIGS. 23A to 23C are views of the main part of the sheet separation device and illustrates a fourth configuration to position the insertion sheet.
Figure 23B:
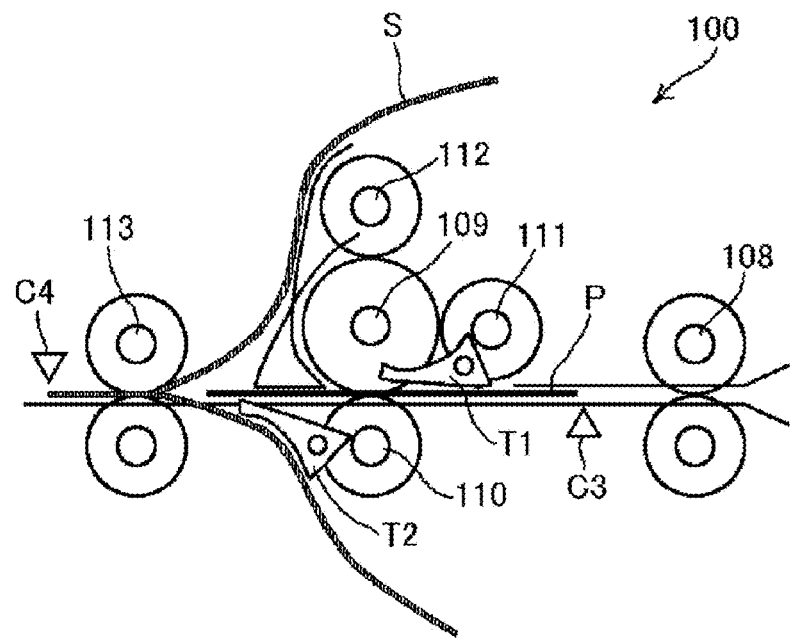
Figure 23C:
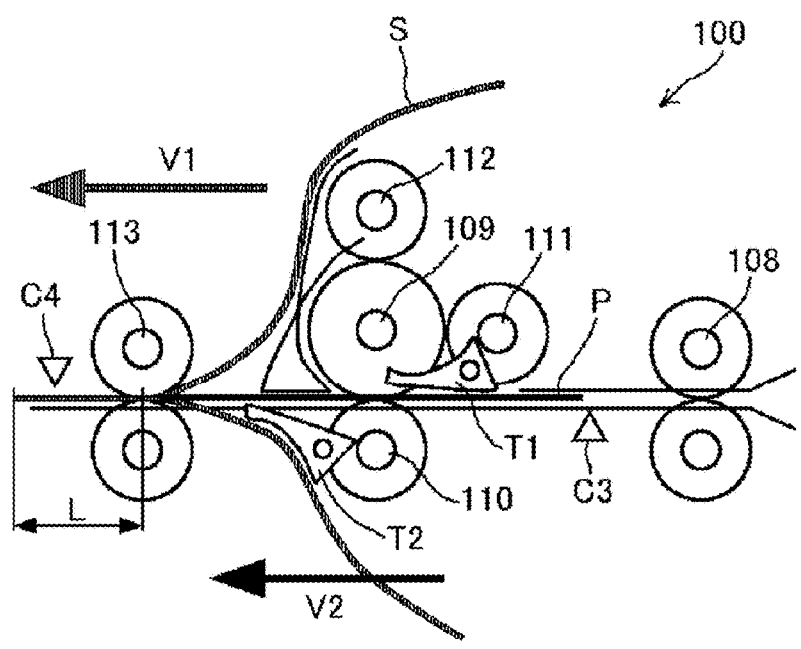

The fourth configuration is described referring to FIGS. 23A, 23B, and 23C, which illustrating the main part of the sheet separation device 100. As illustrated in FIG. 23A, the sheet separation device 100 starts conveying the insertion sheet P after the lamination sheet S is separated. Next, as illustrated in FIG. 23B, the exit roller pair 113 conveys the lamination sheet S in the forward conveyance direction, and adjusts the position (the projection amount) of the bonded end of the lamination sheet S in the forward conveyance direction from the nip of the exit roller pair 113. The conveyance position of the lamination sheet S can be detected with the sheet sensor C4, and the conveyance position of the insertion sheet P can be detected by the sheet sensor C3.

As illustrated in FIG. 23C, the sheet separation device 100 conveys the lamination sheet S and the insertion sheet P in the forward conveyance direction at the same conveyance speed (V2=V1), and inserts the insertion sheet P between the lamination sheet S when the bonded end is at the desired position (the amount of projection L becomes a desired value). The desired value is, for example, a value predetermined by the manufacturer. Alternatively, the desired value can be obtained as follows. The sheet separation device 100 includes an operation panel, via which the user inputs the setting of the insertion position of the insertion sheet P relative to the lamination sheet S. The controller 196 determines the desired value based on the setting. The insertion position setting may be obtained from an image forming apparatus or the like to which the sheet separation device 100 is coupled.

Also in this case, the exit roller pair 113 does not stop, which is advantageous in improving the productivity compared with the first and second configurations.

A fifth configuration is described with reference to FIGS. 24A, 24B, and 24C, which illustrates the main part of the sheet separation device. In the fifth configuration, a plurality of insertion sheets P are inserted into the lamination sheet S by using any of the first to fourth configurations illustrated in FIGS. 20 to 23C.

Figure 24A:
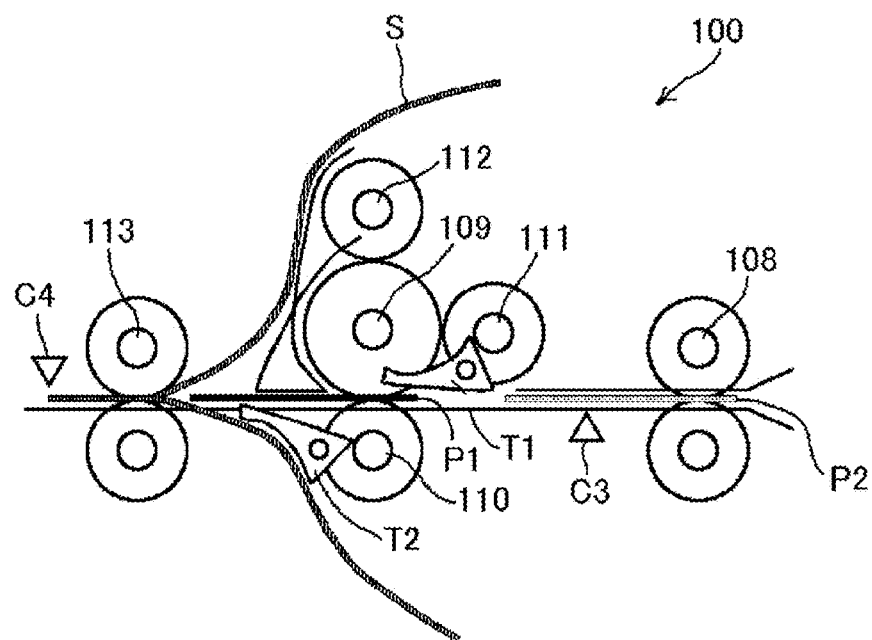
FIGS. 24A to 24C are views of the main part of the sheet separation device and illustrates a fifth configuration to position the insertion sheet.

As illustrated in FIG. 24A, using any one of the first to fourth configurations, a first insertion sheet P1 is positioned and inserted in the lamination sheet S. Next, as illustrated in FIG. 24B, using any of the first to fourth configurations, an insertion sheet P2, subsequent to the first insertion sheet P1, is positioned at a position different from the first insertion sheet P1 (not to overlap with the first insertion sheet P1) in the conveyance direction and inserted in the lamination sheet S. Then, as illustrated in FIG. 24C, the two sheets of the lamination sheet S are jointed, and the opening is closed.

Figure 24B:
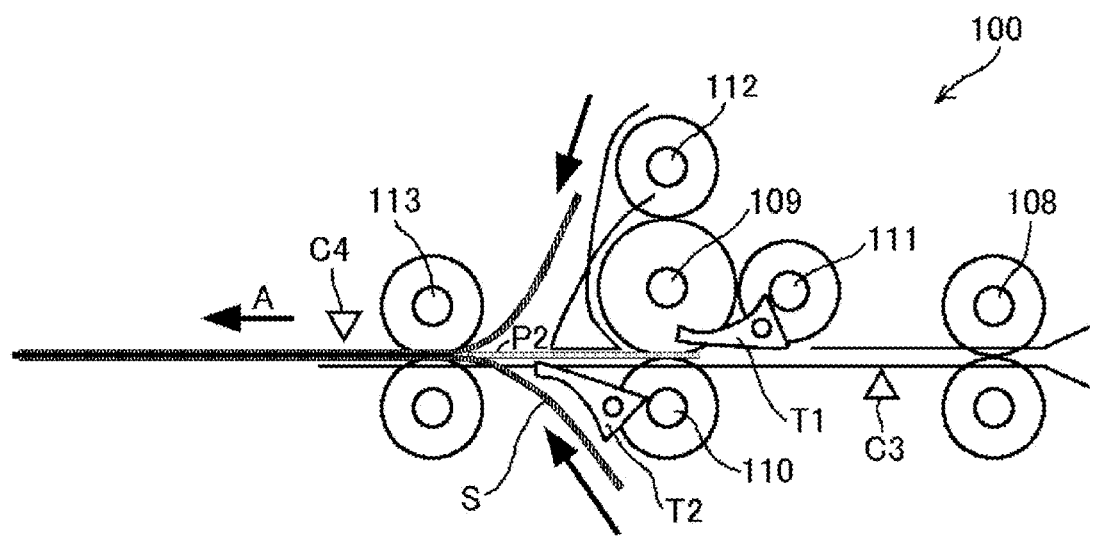
Figure 24C:
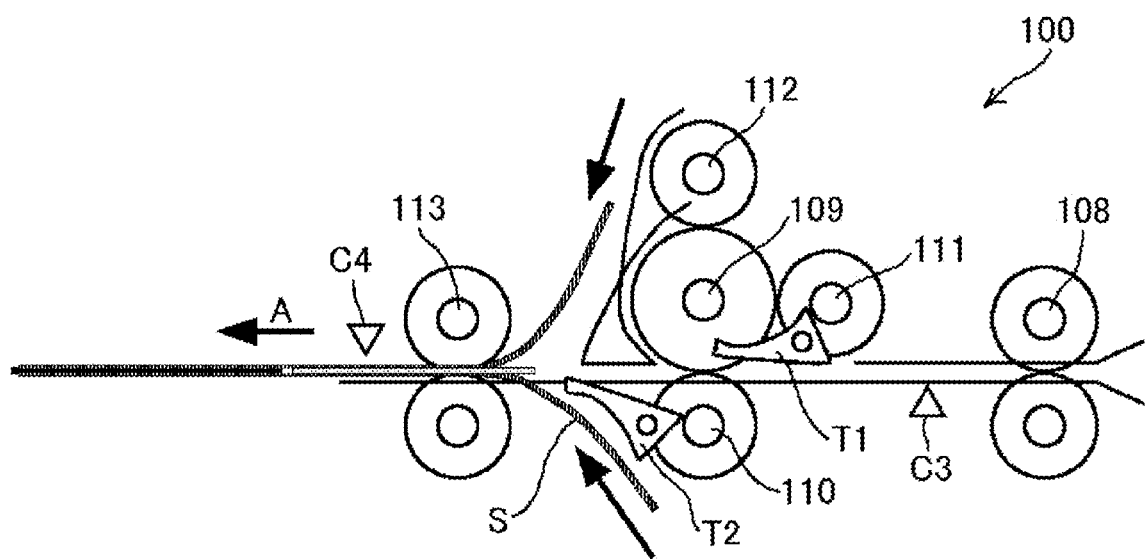

In FIGS. 24A to 24C, the two insertion sheets P1 and P2 are inserted in the lamination sheet S. However, three or more insertion sheets P can be positioned and inserted in a similar manner.

As described above, in the sheet separation device according to the present embodiment, since the amount of projection L of the separated lamination sheet S from the nip of the exit roller pair 113 can be adjusted, a plurality of insertion sheets P can be positioned and inserted at desired positions.

Figure 25A:
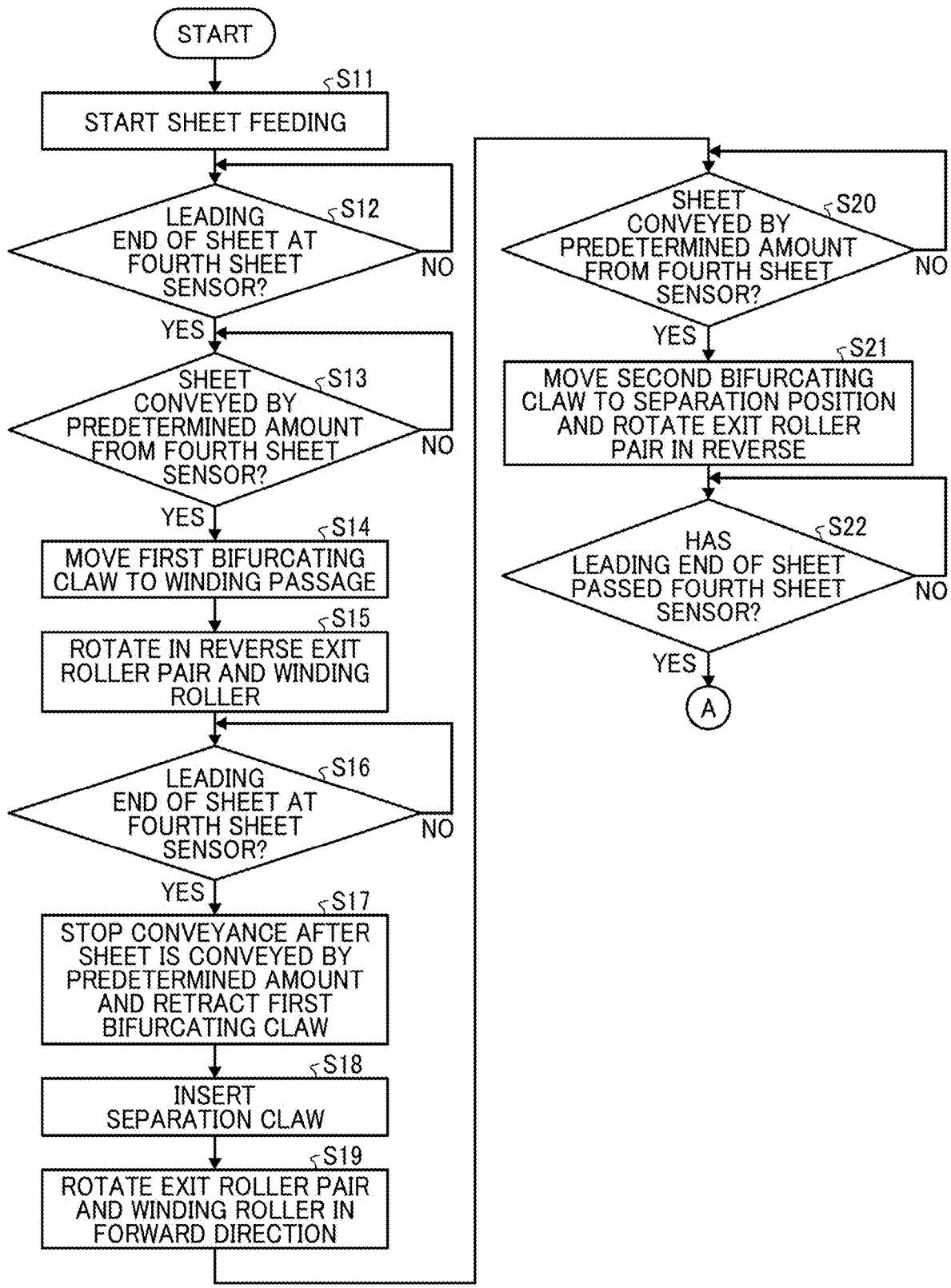
FIG. 25A is a flowchart illustrating a series of operations from sheet feeding to completion of separation of the lamination sheet.
Figure 25B:
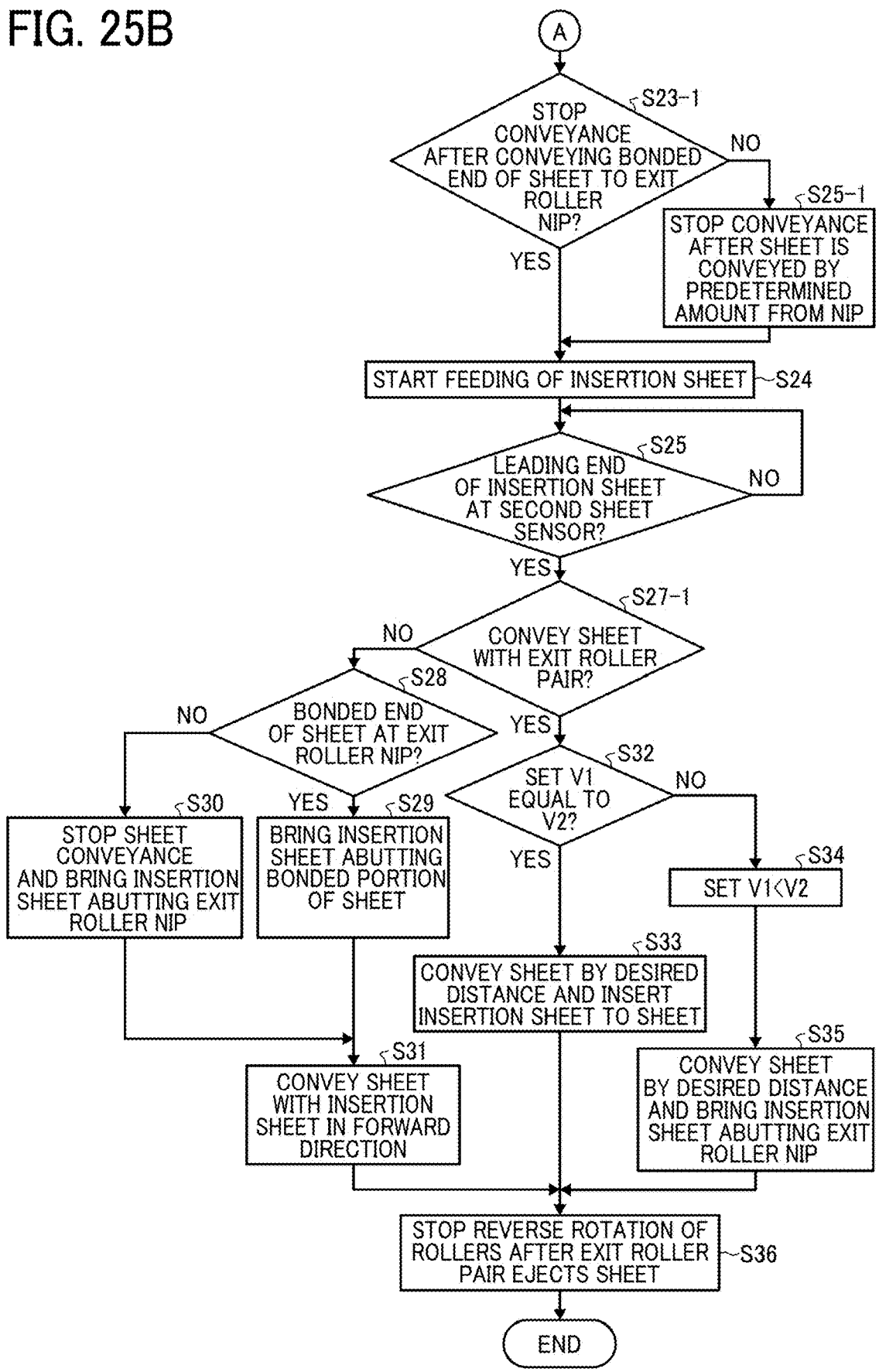
FIG. 25B is a flowchart illustrating a series of operations from feeding of the insertion sheet to completion of inserting of the insertion sheet by the first to fourth configurations.

FIG. 25A is a flowchart illustrating a series of operations from sheet feeding to completion of separation of the sheet. FIG. 25B is a flowchart illustrating a series of operations from feeding of the insertion sheet to completion of inserting of the insertion sheet by the first to fourth configurations. The description below proceeds while indicating the reference numerals indicated in the flowchart.

The process from the start of sheet feeding by the sheet separation device 100 in S11 to the determination of whether the leading end of the lamination sheet S has passed the sheet sensor C4 in S22 is the same as that in the flowchart of FIG. 19. Therefore, the description is omitted.

Next, in S23-1, the sheet separation device 100 determines whether to stop the conveyance after conveying the bonded end of the lamination sheet S to the nip of the exit roller pair 113. When the bonded end is kept at the nip (Yes in S23-1), in S24, feeding of the insertion sheet P is started (see FIG. 12). On the other hand, when the bonded end is not to be kept at the nip (No in S23-1), in S25-1, the lamination sheet S is conveyed from the nip by a predetermined amount and then stopped.

Next, in S25, when the sheet separation device 100 determines that the leading end of the insertion sheet P has arrived at the sheet sensor C2 (the second sheet sensor), in S27-1, the sheet separation device 100 determines whether to convey the lamination sheet S with the exit roller pair 113.

When the lamination sheet S is not conveyed (No in S27-1), in S28, the sheet separation device 100 determines whether or not the bonded portion of the lamination sheet S is at the nip of the exit roller pair 113.

When the bonded end of the lamination sheet S is at the nip of the exit roller pair 113 (Yes in S28), the process proceeds to S29. In S29, the sheet separation device 100 brings the insertion sheet P into contact with the bonded portion, thereby positioning the insertion sheet P relative to the lamination sheet S (the first configuration, see FIG. 20).

On the other hand, when the bonded portion of the lamination sheet S is not at the nip of the exit roller pair 113 (No in S28), the process proceeds to S30. In S30, the sheet separation device 100 conveys the lamination sheet S a desired distance from the exit roller pair 113, stops the conveyance, and brings the insertion sheet P in the nip of the exit roller pair 113, to be positioned relative to the lamination sheet S (the second configuration, see FIG. 21).

In S31, the sheet separation device 100 conveys the lamination sheet S with the insertion sheet P inserted therein in the forward conveyance direction.

In response to a determination that the lamination sheet S is to be conveyed (Yes in S27-1), the process proceeds to S32. In S32, the sheet separation device 100 determines whether to set the conveyance speed V1 of the lamination sheet S in the forward conveyance direction equal to the conveyance speed V2 of the insertion sheet P in the forward conveyance direction.

In response to a determination that the conveyance speed V1 of lamination sheet S in the forward conveyance direction is set equal to the conveyance speed V2 of the insertion sheet P in the forward conveyance direction (Yes in S32), the process proceeds to S33. In S33, the sheet separation device 100 inserts the insertion sheet P in the lamination sheet S when the bonded end of the lamination sheet S is at the desired position (the amount of projection L) from the nip of the exit roller pair 113 (the fourth configuration, see FIGS. 23A to 23C).

In response to a determination that the conveyance speed V1 of lamination sheet S in the forward conveyance direction is not set equal to the conveyance speed V2 of the insertion sheet P in the forward conveyance direction (No in S32), in S34, the sheet separation device 100 sets the conveyance speed V1 of the lamination sheet S in the forward conveyance direction higher than the conveyance speed V2 of the insertion sheet P in the forward conveyance direction. In S35, when the lamination sheet S is conveyed by a desired distance from the exit roller pair 113, the sheet separation device 100 brings the insertion sheet P in the nip of the exit roller pair 113, thereby positioning the insertion sheet P (the third configuration, see FIG. 22). Then, the sheet separation device 100 conveys the lamination sheet S and the insertion sheet P in the forward conveyance direction, with the conveyance speed V2 set equal to the conveyance speed V1.

After the inserting completes, in S36, the exit roller pair 113 ejects the lamination sheet S, after which the sheet separation device 100 stops the rotation of all rollers.

As described above, the sheet separation device 100 according to the present embodiment can insert the insertion sheet P at a desired position of the separated lamination sheet S by the first to fourth configurations.

Descriptions are given of variations according to the present embodiment.

A first variation is described below. In the above description with reference to FIG. 6, the end of the lamination sheet S can be secured to the winding roller 109 as the lamination sheet S is wound around over the full circumference or greater of the winding roller 109. By contrast, in the present variation, a description is given of a sheet separation device that can separate sheets of the lamination sheet S by winding the sheets over less than the full circumference of the roller.

Figure 26:
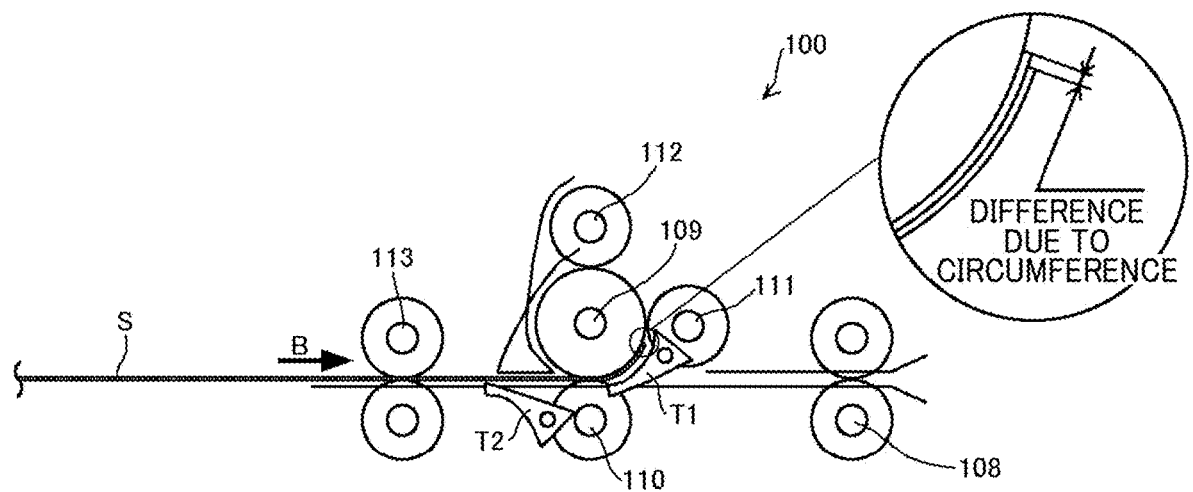
FIG. 26 is a view of a structure illustrated in FIG. 4, together with a partial enlarged view of a lamination sheet on a winding roller illustrated in FIG. 4.
Figure 27:
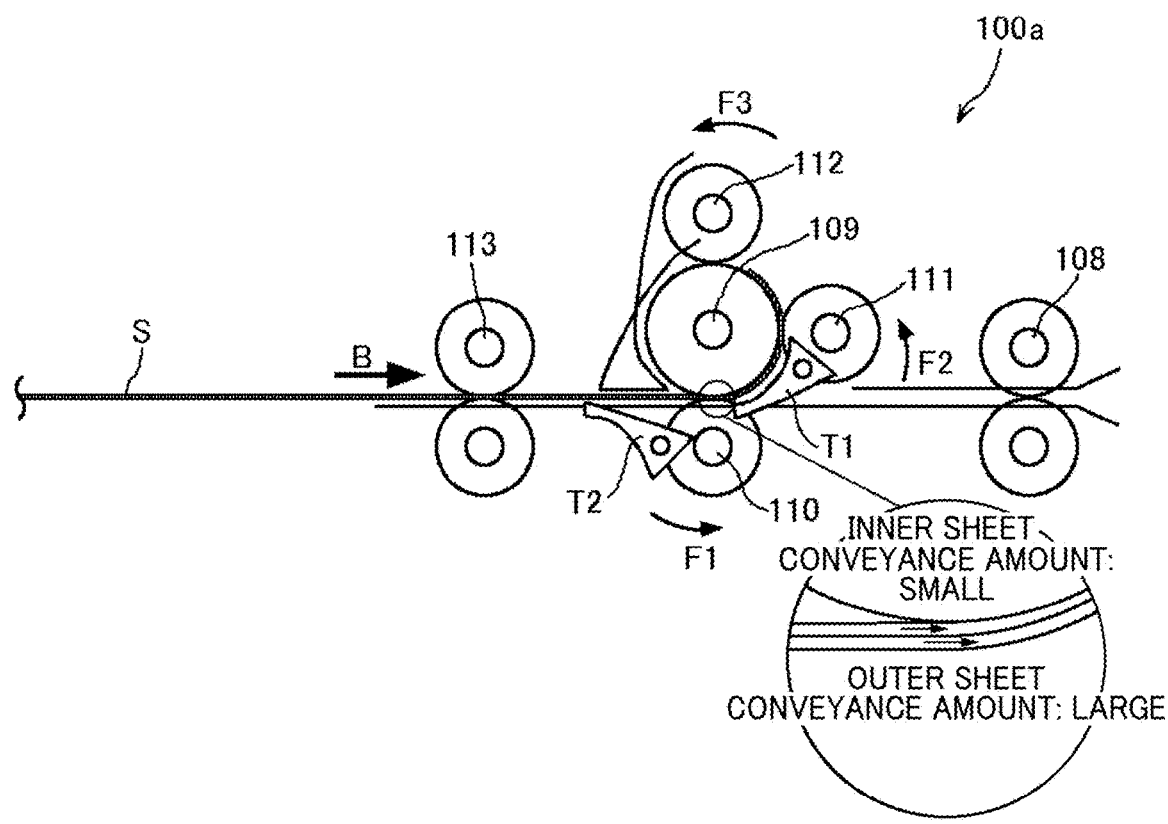
FIG. 27 is a view of a main part of a sheet separation device according to a first variation, together with a partial enlarged view of a lamination sheet on a winding roller.

FIG. 26 is a view of the structure illustrated in FIG. 4, together with a partial enlarged view of the lamination sheet S on the winding roller. FIG. 27 is a view of a main part of a sheet separation device 100a according to the first variation, together with a partial enlarged view of the lamination sheet on the winding roller.

As illustrated in the partial enlarged view of FIG. 26, when the lamination sheet S is wound around the winding roller 109, a difference is created in the conveyance amount of the lamination sheet S due to the difference in winding circumferential length.

By contrast, as illustrated in FIG. 27, in the sheet separation device 100a according to the present variation, a relation $F1<F2<F3$ is established where F1 represents the nipping force provided by the driven roller 110, F2 represents the nipping force provided by the grip roller 111, and F3 represents the nipping force provided by the grip roller 112. That is, the nipping forces by the grip rollers 111 and 112 are made larger than the nipping force provided by the driven roller 110, and the displacement between the inner sheet and the outer sheet of the lamination sheet S is regulated in the portions where the grip rollers 111 and 112 press against the driven roller 110.

Therefore, the inner sheet and outer sheet slip past each other by an amount equivalent to the circumferential length difference in the nip between the driven roller 110 and the winding roller 109. Thus, the conveyance amount of the inner sheet of the lamination sheet S is smaller than the conveyance amount of the outer sheet. As a result, even if the lamination sheet S is not wound around the winding roller 109 over the full circumference or greater, the slack in the inner sheet gathers between the exit roller pair 113 and the winding roller 109, thereby creating the gap g (space) between the inner sheet and the outer sheet.

Thus, owing to the configuration in which the strengths of nipping force provided by the driven roller 110 and the grip rollers 111 and 112 increase in the winding rotation direction of the winding roller 109, the lamination sheet S can be separated by winding the sheets over less than full circumference of the roller. Accordingly, the winding amount of the lamination sheet S can be reduced, and time required for separation can be shortened.

Further, it is desirable that the nipping force provided by the driven roller 110 and the grip rollers 111 and 112 can be changed by, for example, adjusting the respective contact forces against the winding roller 109. The sheet separation device 100a is advantageous in that sheets of various sizes can be separated by adjusting the amount of winding of the sheet.

Figure 28:
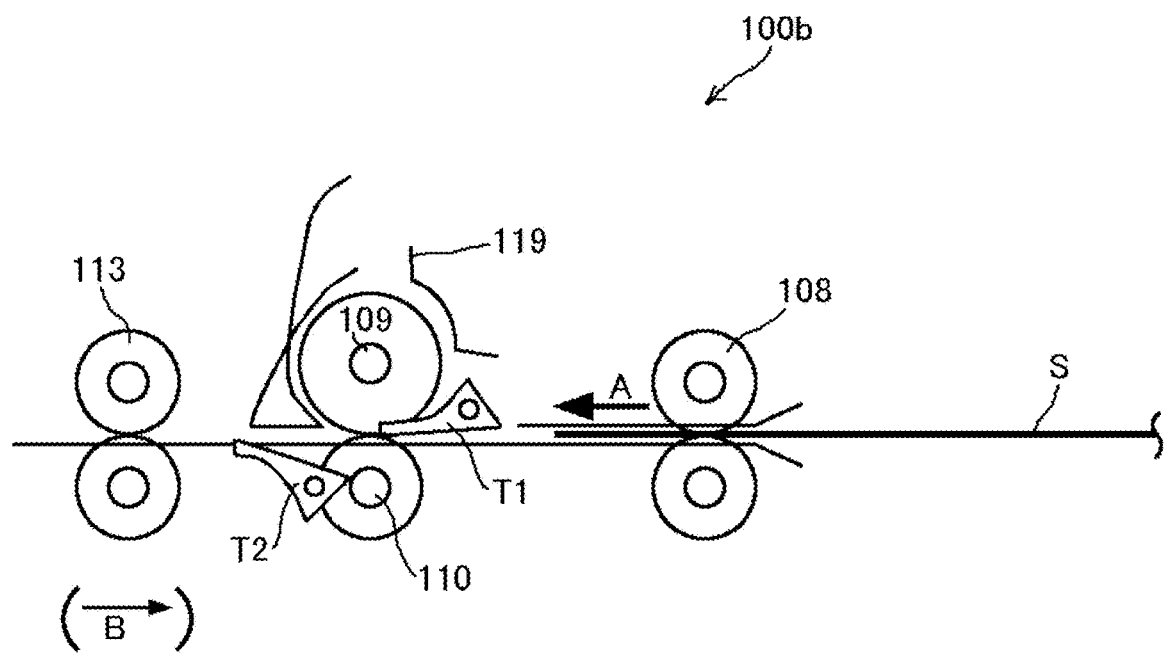
FIG. 28 is a view of a main part of a sheet separation device according to a second variation.

A second variation is described below. FIG. 28 is a view illustrating a main part of a sheet separation device 100b according to a second variation. As illustrated in FIG. 28, the sheet separation device 100b according to the present variation includes, instead of the grip rollers 111 and 112, a guide member 119 that guides the two-ply lamination sheet S around the circumference of the winding roller 109.

By winding the lamination sheet S around the winding roller 109 with the guide member 119, the lamination sheet S can be separated. Both the guide member 119 and the grip rollers 111 and 112 can be provided.

Figure 29:
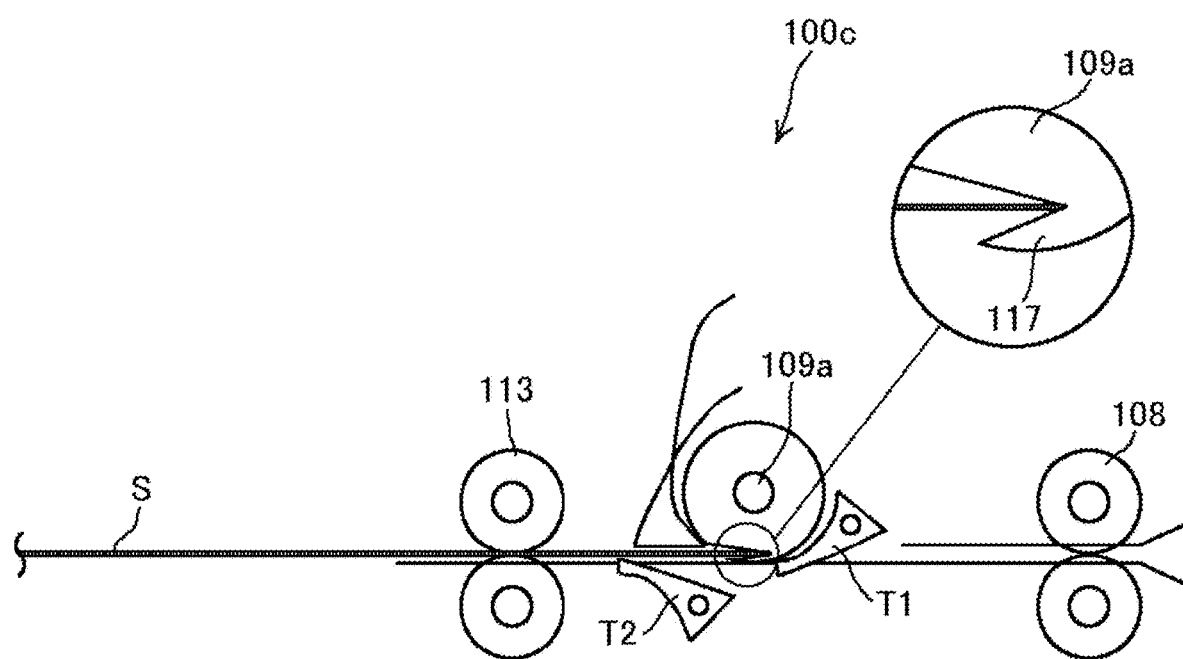
FIG. 29 is a view of a main part of a sheet separation device according to a third variation, together with a partial enlarged view of a wedge part.

A third variation is described below. FIG. 29 is a view of a main part of a sheet separation device 100c according to the third variation, together with a partial enlarged view of a winding roller including a wedge portion. In FIG. 29, elements identical to those illustrated in FIG. 2 are given identical reference numerals, and the descriptions thereof are omitted.

The sheet separation device 100c according to the present variation does not include the driven roller 110 and the grip rollers 111 and 112. Instead, the sheet separation device 100c includes a winding roller 109a including a wedge portion 117 as illustrated in the partial enlarged view. The wedge portion 117 is an example of a holder that holds the two-ply lamination sheet S. The wedge portion 117 is molded together with the winding roller 109a on the outer periphery thereof.

In the sheet separation device 100c according to the present variation, the exit roller pair 113 conveys the lamination sheet S to the winding roller 109a and inserts the end of the lamination sheet S into the wedge portion 117, thereby holding the end of the lamination sheet S.

Figure 30A:
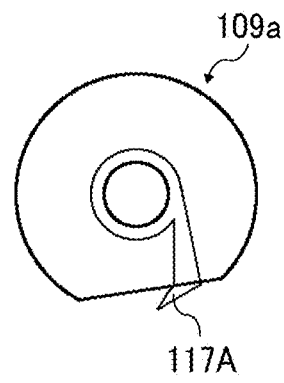
FIG. 30A is a schematic view of an example of the wedge part, which is a separate component from the winding roller.
Figure 30B:
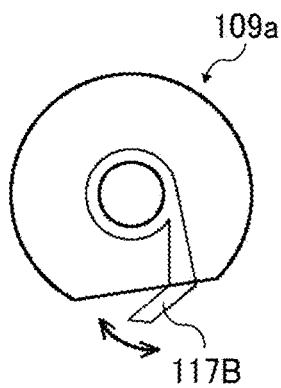
FIG. 30B is a schematic view of another example of the wedge part, which is an elastic member.

The required function of the wedge portion 117 is securing the lamination sheet S (the end thereof) to the winding roller 109a, and the wedge portion 117 can be a separate component from the winding roller 109a as illustrated in FIG. 30A. Further, as illustrated in FIG. 30B, the lamination sheet S can be nipped (held) by an elastic member 117B, such as a clip, having an elastic force. Such a structure can be selected depending on the configuration of the sheet separation device.

Figure 31:
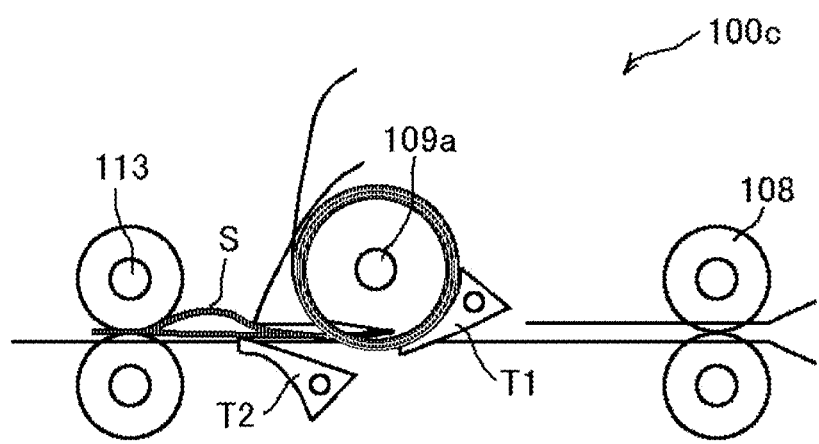
FIG. 31 is a view of the main part of the sheet separation device according to the third variation, winding the lamination sheet around the winding roller.

In the sheet separation device 100c according to the present variation, the operation to conveying the lamination sheet S to the winding roller 109a and the operation after holding the lamination sheet S on the winding roller 109a are the same as those in the first embodiment described above. As illustrated in FIG. 31, by winding the lamination sheet S around the winding roller 109a, a difference in winding circumferential length is caused between the inner and outer sheets of the lamination sheet S, and the lamination sheet S can be separated.

Since the sheet separation device 100c according to the present variation does not use the driven roller 110 and the grip rollers 111 and 112, adjustment of the conveyance force thereof is not necessary. In addition, compared with the above-described embodiment, the configuration is simpler, and the entire apparatus can be further simplified and downsized.

Next, descriptions are given of a laminator, an image forming apparatus, and an image forming system including a sheet separation device according to the present disclosure.

Figure 32:
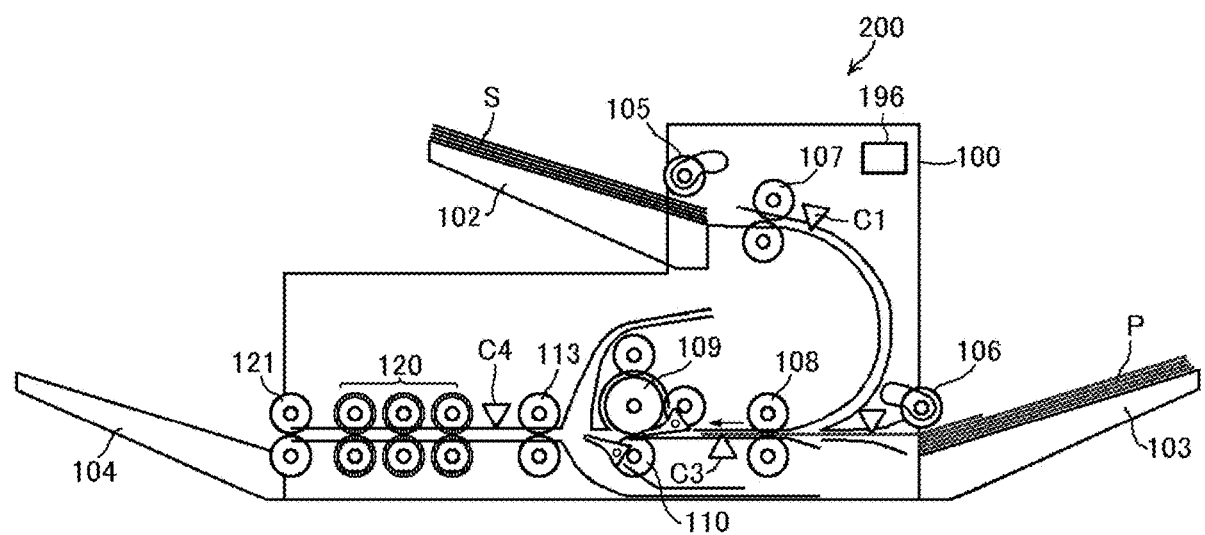
FIG. 32 is a view illustrating an example of general arrangement of a laminator according to one embodiment, including the sheet separation device.

FIG. 32 is a view illustrating an example of general arrangement of the laminator including the sheet separation device according to one embodiment of the present disclosure. As illustrated in FIG. 32, a laminator 200 includes the sheet separation device 100 described above, a heat and pressure roller 120 (heat and pressure rotator) to heat and press the lamination sheet S, and an ejection roller 121 disposed downstream from the heat and pressure roller 120.

The laminator 200 can perform a series of operations from feeding and separation of the lamination sheet S, insertion of the insertion sheet P, and lamination with heat and pressure on a stand-alone basis. This series of operations can be carried out automatically without human intervention, and convenience can be improved.

Figure 33:
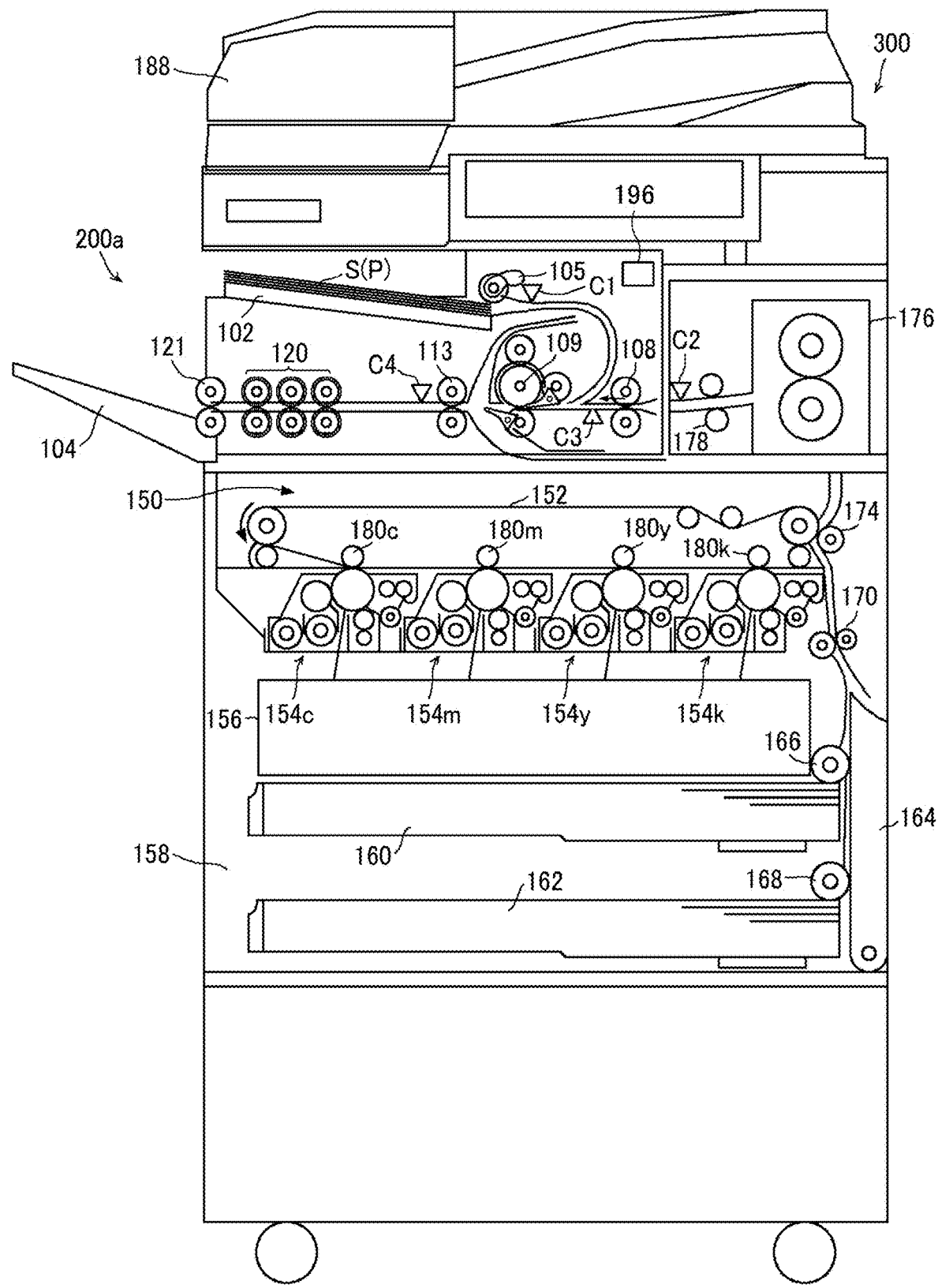
FIG. 33 is a view illustrating an example of general arrangement of an image forming apparatus according to one embodiment, including the laminator.

FIG. 33 is a view illustrating an example of general arrangement of an image forming apparatus including the laminator according to one embodiment of the present disclosure. An image forming apparatus 300 illustrated in FIG. 33 includes a laminator 200a to perform a laminating process.

The laminator 200a includes the sheet tray 102 on which lamination sheets S or insertion sheets P are stacked. Additionally, the laminator 200a can receive at least one of the lamination sheets S and the insertion sheets P fed from the image forming apparatus 300. Therefore, an image can be added in-line on the lamination sheet S or the insertion sheet P by the image forming apparatus 300 (for example, a printer or a copier).

The configuration of the image forming apparatus 300 is described in detail. As illustrated in FIG. 33, an intermediate transfer device 150 is disposed in the main body of the image forming apparatus 300. The intermediate transfer device 150 includes an endless intermediate transfer belt 152 entrained around a plurality of rollers and stretched almost horizontally. The intermediate transfer belt 152 rotates counterclockwise in the drawing.

Image forming devices 154c, 154m, 154y, and 154k are arranged side by side along and below the intermediate transfer belt 152 of the intermediate transfer device 150, in that order in a direction in which the intermediate transfer belt 152 is rotated. The image forming devices 154c, 154m, 154y, and 154k form toner images of cyan, magenta, yellow, and black, respectively. Each of the image forming devices 154c, 154m, 154y, and 154k includes a drum-shaped image bearer that rotates clockwise in the drawing. Around the image bearer, a charging device, a developing device, a transfer device, and a cleaning device are disposed. Below each image forming device 154, an exposure device 156 is disposed.

Below the exposure device 156, a sheet feeder 158 is disposed. The sheet feeder 158 includes a first sheet feeding tray 160 that stores lamination sheets S and a second sheet feeding tray 162 that stores insertion sheets P. The first sheet feeding tray 160 is an example of a two-ply sheet tray on which two-ply sheets are stacked, and the second sheet feeding tray 162 is an example of a medium tray on which sheet-like media are stacked.

A first sheet feeding roller 166 is disposed at the upper right of the first sheet feeding tray 160 and feeds the lamination sheets S from the first sheet feeding tray 160 one by one to a sheet feeding passage 164. A second sheet feeding roller 168 is disposed at the upper right of the second sheet feeding tray 162 and feeds the insertion sheets P from the second sheet feeding tray 162 one by one to the sheet feeding passage 164.

The sheet feeding passage 164 extends from the lower side to the upper side on the right side in the main body of the image forming apparatus 300 and communicates with the laminator 200a inside the image forming apparatus 300. The sheet feeding passage 164 is provided with a conveyance roller 170, a secondary transfer device 174 disposed opposite the intermediate transfer belt 152, a fixing device 176, a sheet ejection device 178 including an ejection roller pair, and the like in order.

The first sheet feeding roller 166, the conveyance roller 170, and the sheet feeding passage 164 are examples of a two-ply sheet feeder that feeds a two-ply sheet from the first sheet feeding tray 160 (the two-ply sheet tray). The second sheet feeding roller 168, the conveyance roller 170, and the sheet feeding passage 164 are examples of a medium feeder that feeds a sheet medium from the second sheet feeding tray 162 (the medium tray). The intermediate transfer device 150, the fixing device 176, and the like are examples of an image forming device that forms an image on a two-ply sheet or a sheet medium.

Next, a description is given of an operation of forming an image on the lamination sheet S and then performing lamination in the image forming apparatus 300 according to the present embodiment.

To form an image on the lamination sheet S, first, an image reading device 188 reads a document image, and the exposure device 156 performs image writing. Next, the image forming devices 154c, 154m, 154y, and 154k form respective color toner images on the image bearers thereof. Then, primary transfer devices 180c, 180m, 180y, and 180k sequentially transfer the toner images onto the intermediate transfer belt 152, thereby forming a color image formed thereon.

By contrast, the image forming apparatus 300 rotates the first sheet feeding roller 166 to feed the lamination sheet S to the sheet feeding passage 164. Then, the lamination sheet S is conveyed by the conveyance roller 170 through the sheet feeding passage 164 and sent to a secondary transfer position, timed to coincide with the color image on the intermediate transfer belt 152. Then, the secondary transfer device 174 transfers the color image formed on the intermediate transfer belt 152 as described above onto the lamination sheet S.

After the image transfer, the fixing device 176 fixes the image on the lamination sheet S, and the sheet ejection device 178 sends the lamination sheet S to the laminator 200a.

Further, the image forming apparatus 300 rotates the second sheet feeding roller 168 to feed the insertion sheet P to the sheet feeding passage 164, and the sheet ejection device 178 sends the insertion sheet P to the laminator 200a.

In this way, the lamination sheet S on which the image has been formed and the insertion sheet P are sent to the laminator 200a, and a laminating process is performed. The details of the laminating process have been described above and redundant descriptions are omitted.

With the above-described configuration, the image forming apparatus 300 according to the present embodiment can perform the laminating process with the laminator 200a after image formation on the insertion sheet P. In addition, the image forming apparatus 300 can perform the laminating process after image formation on both the insertion sheet P and the lamination sheet S.

Figure 34:
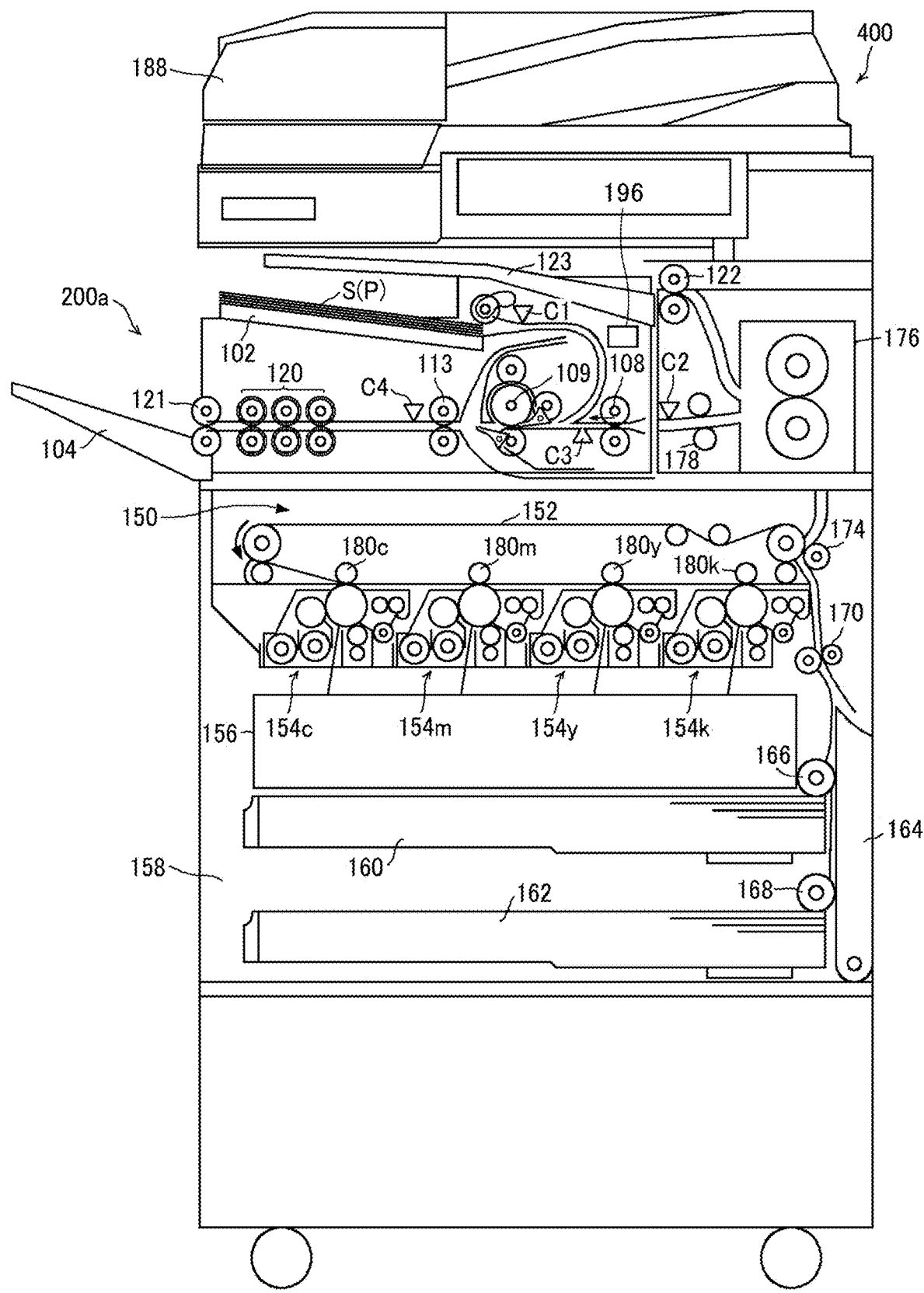
FIG. 34 is a view illustrating general arrangement of an image forming apparatus according to a variation, including the laminator.

FIG. 34 is a view illustrating general arrangement of a variation of the image forming apparatus including the laminator according to one embodiment of the present disclosure. Differently from the image forming apparatus 300 illustrated in FIG. 33, a main body of an image forming apparatus 400 includes an ejection roller pair 122 and an output tray 123.

When the laminating process is not performed, the image forming apparatus 400 can eject the recording medium on which the image is formed using the ejection roller pair 122 of the main body to the output tray 123 of the main body. Therefore, the image forming apparatus 400 does not decrease the image output speed when the laminating process is not performed.

The laminator 200a can be removably installed inside the image forming apparatus 400. That is, when the laminating process is unnecessary, the laminator 200a can be removed from the image forming apparatus 400.

In addition, in the laminator 200a thus removed, the sheet feeding tray 103 on which the insertion sheets P are stacked and the pickup roller 106 to feed the insertion sheets P from the sheet feeding tray 103 can be mounted, so that the laminator 200a is used as a stand-alone machine similar to that illustrated in FIG. 32.

The image forming apparatus 300 illustrated in FIG. 33 and the image forming apparatus 400 illustrated in FIG. 34 can include a sheet separation device instead of the laminator. The image forming apparatus 400 illustrated in FIG. 34 can include a sheet separation device that is removably mounted.

Further, aspects of this disclosure can be embodied as an image forming system that includes an image forming apparatus and the sheet separation device 100, 100a, 100b, or 100c, or the laminator 200 detachably coupled to the image forming apparatus. Furthermore, aspects of this disclosure can be embodied as a system including at least one of a sheet feeder (a stacker) and a case binding device. Note that, in the case where the lamination sheet S is passed through the fixing device 176, the lamination sheet S is not bonded at the fixing temperature, but is bonded by application of heat higher than the fixing temperature.

Although the image forming apparatuses 300 and 400 employ electrophotography for image formation on the lamination sheet S and the insertion sheet P in the description above, the image formation method is not limited thereto, and inkjet, screen printing, or other printing method can be used.

The embodiments of the present disclosure has been described in detail above. Numerous additional modifications to the above-described embodiment and variations are possible. It is therefore to be understood that, within the scope of the appended claims, the disclosure of this patent specification may be practiced otherwise than as specifically described herein. For example, the embodiments and the modifications may be combined. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A sheet processing device configured to separate a two-ply sheet in which two sheets are bonded together at a portion of the two-ply sheet and insert at least one sheet medium in the two-ply sheet, the sheet processing device comprising:
a first conveyor configured to convey the two-ply sheet in a first direction and a second direction reverse to the first direction, the first conveyor including a pair of rotators pressed against each other; and
control circuitry configured to:
control the first conveyor to project a bonded portion of the two-ply sheet from a nip of the first conveyor, and
adjust an amount of projection of the bonded portion from the nip.

2. The sheet processing device according to claim 1, further comprising:
a second conveyor upstream from the first conveyor in the first direction, the second conveyor being configured to convey the at least one sheet medium and insert the at least one sheet medium in the two-ply sheet being sandwiched by the first conveyor.

3. The sheet processing device according to claim 1, further comprising:
a sheet end sensor configured to detect an end of the two-ply sheet in the first direction,
wherein the control circuitry is configured to adjust the amount of projection of the bonded portion based on a detection result generated by the sheet end sensor.

4. The sheet processing device according to claim 1, further comprising:
a second conveyor upstream from the first conveyor in the first direction,
wherein the control circuitry is configured to:
stop the first conveyor with the bonded portion of the two-ply sheet held in the nip of the first conveyor, and
control the second conveyor to bring the at least one sheet medium into contact with the bonded portion held in the nip, to determine relative positions between the two-ply sheet and the at least one sheet medium.

5. The sheet processing device according to claim 1, further comprising:
a second conveyor upstream from the first conveyor in the first direction,
wherein the control circuitry is configured to:
control the first conveyor to hold the two-ply sheet in the nip of the first conveyor in a state where the bonded portion of the two-ply sheet is downstream from the nip of the first conveyor in the second direction, and
control the second conveyor to bring the at least one sheet medium into contact with a portion of the two-ply sheet held in the nip of the first conveyor, to determine relative positions between the two-ply sheet and the at least one sheet medium.

6. The sheet processing device according to claim 1, further comprising:
a winding member including a holder configured to hold the two-ply sheet, the winding member being configured to wind the two-ply sheet held by the holder, to create a space between two plies of the two-ply sheet and separate the two plies.

7. The sheet processing device according to claim 1, further comprising:
a winding member; and
a nipping member opposite the winding member and configured to nip the two-ply sheet with the winding member,
wherein the winding member is configured to wind the two-ply sheet held by the nipping member, to create a space between two plies of the two-ply sheet and separate the two plies.

8. The sheet processing device according to claim 1, further comprising:
a separation claw configured to be inserted, in a width direction of the two-ply sheet, into a space between two plies of the two-ply sheet,
wherein the control circuitry is configured to control the first conveyor to convey the two-ply sheet with the separation claw inserted in the space, to separate the two plies.

9. The sheet processing device according to claim 1, further comprising:
a second conveyor upstream from the first conveyor in the first direction,
wherein the control circuitry is configured to cause the second conveyor to:
convey the at least one sheet medium in the second direction at a speed higher than a speed at which the first conveyor conveys the two-ply sheet in the second direction, and
bring the at least one sheet medium into contact with a portion of the two-ply sheet held in the nip of the first conveyor, to determine relative positions between the two-ply sheet and the at least one sheet medium.

10. The sheet processing device according to claim 1, further comprising:
a second conveyor upstream from the first conveyor in the first direction,
wherein the control circuitry is configured to cause the second conveyor to:
convey the at least one sheet medium in the second direction at a same speed as a speed at which the first conveyor conveys the two-ply sheet in the second direction, and
insert the at least one sheet medium in the two-ply sheet at a timing when the amount of projection of the two-ply sheet from the nip is a value, to determine relative positions between the two-ply sheet and the at least one sheet medium.

11. The sheet processing device according to claim 1, further comprising:
a second conveyor upstream from the first conveyor in the first direction;
a first stacking tray configured to store the two-ply sheet;
a first feeder configured to feed the two-ply sheet from the first stacking tray to the first conveyor;
a second stacking tray configured to store the at least one sheet medium to be inserted into the two-ply sheet; and
a second feeder configured to feed, from the second stacking tray, the at least one sheet medium to the second conveyor.

12. A laminator comprising:
the sheet processing device according to claim 1; and
a heat and pressure member configured to heat and press the two-ply sheet.

13. An image forming system comprising:
an image forming device configured to form an image on the at least one sheet medium; and
the sheet processing device according to claim 1.

14. An image forming system comprising:
an image forming device configured to form an image on the at least one sheet medium; and
a laminator including,
the sheet processing device according to claim 1, and
a heat and pressure member configured to heat and press the two-ply sheet.

\* \* \* \* \*